(12) United States Patent
de Navas

(10) Patent No.: US 12,523,928 B2
(45) Date of Patent: *Jan. 13, 2026

(54) REAR PROJECTION DISPLAY (RPD) DEVICE FOR AN ELECTRONIC DISPLAY

(71) Applicant: Oliver Moon de Navas, Fontana, WI (US)

(72) Inventor: Oliver Moon de Navas, Fontana, WI (US)

(73) Assignee: RPD12259646 LLC, Fontana, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/088,481

(22) Filed: Mar. 24, 2025

(65) Prior Publication Data

US 2025/0355335 A1   Nov. 20, 2025

Related U.S. Application Data

(63) Continuation-in-part of application No. 18/818,061, filed on Aug. 28, 2024, now Pat. No. 12,259,646.

(60) Provisional application No. 63/715,944, filed on Nov. 4, 2024, provisional application No. 63/649,936, filed on May 20, 2024.

(51) Int. Cl.
*G03B 21/58* (2014.01)
*G03B 21/14* (2006.01)

(52) U.S. Cl.
CPC .......... *G03B 21/58* (2013.01); *G03B 21/145* (2013.01)

(58) Field of Classification Search
CPC ............................. G03B 21/58; G03B 21/145
USPC .................................. 353/79; 359/443, 460
See application file for complete search history.

(56) References Cited

U.S. PATENT DOCUMENTS 5,894,878 A * 4/1999 Morgan ................ G06F 1/1603
160/354
12,259,646 B1 * 3/2025 de Navas ............... G03B 21/60

FOREIGN PATENT DOCUMENTS

JP           2015192791 A  * 11/2015  ............... G09F 9/00

* cited by examiner

*Primary Examiner* — Magda Cruz
(74) *Attorney, Agent, or Firm* — Michael D. Eisenberg; MDE Patents

(57) ABSTRACT

A rear projection display device for use with a display. The rear projection display device includes a flexible white cloth sheet having an inner surface and an outer surface, the flexible cloth sheet being configured to absorb light emitted by a display behind the inner surface and to display the light absorbed on the outer surface for viewing ahead of the display, while placed in front of the display and in contact with a front of the display.

20 Claims, 21 Drawing Sheets

REAR PROJECTION DISPLAY (RPD) DEVICE FOR AN ELECTRONIC DISPLAY

CROSS-REFERENCES TO RELATED APPLICATIONS

The present application is a continuation-in-part of U.S. patent application Ser. No. 18/818,061 file on Aug. 28, 2024, which claims priority from U.S. Provisional Application Ser. No. 63/649,936 filed on May 20, 2024. Further, the present application claims priority from U.S. Provisional Application Ser. No. 63/715,944 filed on Nov. 4, 2024. All the priority documents mentioned above are hereby incorporated herein by reference in their entirety.

TECHNICAL FIELD

The present invention relates to projection screens for electronic displays, and more specifically, but not limited to, projection screens for televisions, computer monitors, tablets, and smart phones.

BACKGROUND OF THE INVENTION

The present invention is made for electronic display devices, such as television (TV) screens, computer screens, tablet screens, and smart phone screens. These screens may be LED, OLED, LCD, CRT, and plasma screens, for example. Televisions are bigger and brighter than ever and also sharper than ever due to the ever-increasing pixel count. Many TVs and screens are purchased too large for the space and environment that they occupy. This causes the light exposure from the TV to be greater than needed for the viewer and may cause headaches and eye irritation.

One solution is to turn down the brightness of the display or set the display screen to "natural mode". This reduces the intensity of the light from the display, but high exposure to light in the room still remains, creating a less pleasurable viewing experience. Also, the dimming feature reduces the color range for the intended viewer thus the quality and vibrancy of the intended image diminishes.

Another solution involves installing rear lights and ambient lighting to engulf the display with external light so as to allow the eyes to be more relaxed by having ambient lighting. This requires further installation of electronic devices thus consuming more energy.

Another key problem is that current solutions for solving the issue of bright screens and blue lights on displays require a more permanent solution example being a plastic laminate which when once placed on the display is not removable thus making the device permanently attached to the device. This can be problematic in that it can cause devaluing of said device.

Other display devices, such as tablets and smartphones, though smaller, also cause high light exposure, especially in the dark, and may cause eye strain. Especially since the viewing of this device is closer to the face as it is usually intended to be handheld.

The present invention addresses the above problems.

BRIEF SUMMARY OF EMBODIMENTS OF THE INVENTION

An aim of the present invention is to provide a rear projection display (RPD) device for an electronic display (such as a television screen, a tablet, a computer monitor, a smart phone, for example). The RPD device covers the display, so that the image from the display is projected onto the RPD device from the back of the RPD device and is displayed on the front of the RPD device for viewing. This decreases direct light exposure from the display. This utilizes a rear projection effect from the display to the RPD device, allowing for a more relaxed viewing experience for the viewer's eyes.

Another aim of the present invention is to provide a RPD device having a cut or shape which ensures that the RPD device of the present invention fits properly onto a display.

Yet another aim of the present invention is to provide a RPD device which becomes attracted to a digital display by electrostatic induction.

A further aim of the present invention is to provide a RPD device for a display, which can cover the display while the display is off, to create a clean white space upon which images or videos can be projected by mini projectors placed in front of the RPD devices.

Therefore, an aspect of some embodiments of the present invention relates to a rear projection display (RPD) device for use with a display, the rear projection display device comprising a flexible white cloth sheet and an elastic band loop. The flexible white cloth sheet has an inner surface and an outer surface, and being configured to absorb light emitted by a display behind the inner surface and to display the light absorbed on the outer surface for viewing ahead of the display, while placed in front of the display and in contact with a front of the display. The elastic band loop is joined to the cloth sheet along a perimeter of the cloth sheet, the elastic band loop having an equilibrium length shorter than the perimeter of the cloth sheet.

In a variant, the cloth sheet has a portion that is folded upon itself to create a fold around the elastic band and sewn to itself to retain the elastic band inside the fold.

The cloth sheet is may be: stretchable in a first direction and not stretchable in a second direction perpendicular to the first direction; or stretchable in the first direction and in the second direction.

In another variant, the cloth sheet comprises a first fabric, wherein the first fabric comprises at least one of: viscose, bamboo, nylon, tnt, cotton, polycotton, polyester, and polypropylene, rayon, or nylon wool.

The cloth sheet may comprise 80%-100% of the first fabric and 0%-20% of elastane by weight.

The cloth sheet may comprise 90%-99% of the first fabric and 1%-10% of elastane by weight.

In yet another variant, the cloth sheet comprises a first fabric which comprises synthetic fabric configured to become electrostatically induced by electrical charge on the front of the display when the display is on and when the cloth sheet is in a vicinity of the front of the display.

The cloth sheet may comprise 80%-100% of the first fabric and 0%-20% of elastane by weight.

The cloth sheet may comprises 90%-99% of the first fabric and 1%-10% of elastane by weight.

In a further variant, a lower section of the perimeter of the cloth sheet has an internally rounded or internally bending shape.

Another aspect of some embodiments of the present invention relates to a rear projection display device for use with a display. The rear projection display device includes a flexible white cloth sheet having an inner surface and an outer surface, the flexible cloth sheet being configured to absorb light emitted by a display behind the inner surface and to display the light absorbed on the outer surface for viewing ahead of the display, while placed in front of the display and in contact with a front of the display. The cloth sheet comprises a first fabric which comprises a synthetic fabric configured to become configured to become electrostatically induced by electrical charge on the front of the display when the display is on and when the cloth sheet is in a vicinity of the front of the display.

The cloth sheet may comprise 80%-100% of the first fabric and 0%-20% of elastane by weight.

The cloth sheet may comprise 90%-99% of the first fabric and 1%-10% of elastane by weight.

In a variant, the cloth sheet is: stretchable in a first direction and not stretchable in a second direction perpendicular to the first direction; or stretchable in the first direction and in the second direction.

In another variant the RPD device further comprises an elastic band loop joined to the cloth sheet along a perimeter of the cloth sheet, the elastic band loop having an equilibrium length shorter than the perimeter of the cloth sheet.

In yet another variant, the cloth sheet has a portion that is folded upon itself to create a fold around the elastic band and sewn to itself to retain the elastic band inside the fold.

In a further variant, a lower section of a perimeter of the cloth sheet has an internally rounded or internally bending shape.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 41 is a side cross-section illustrating the cloth sheet stretched in front of the display when the display is off, with a gap between the inner surface of the cloth sheet and the front of the display;

FIG. 42 is a side cross-section illustrating the cloth sheet contacting the display due to electrostatic attraction between the inner surface of the cloth sheet and the front of the display when the display is on;

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
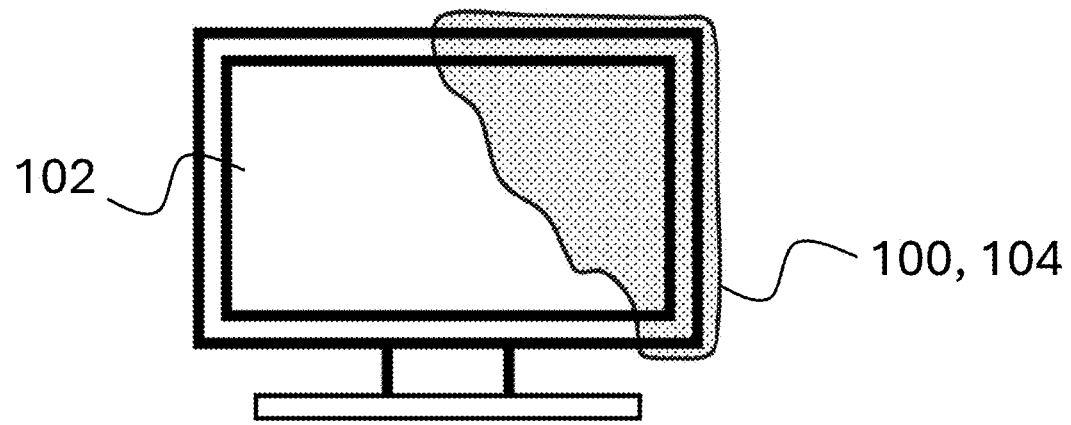
FIG. 1 illustrates a front of a display (in the form of a TV or a monitor) partially covered by a RPD device of the present invention.
Figures 2, 3:
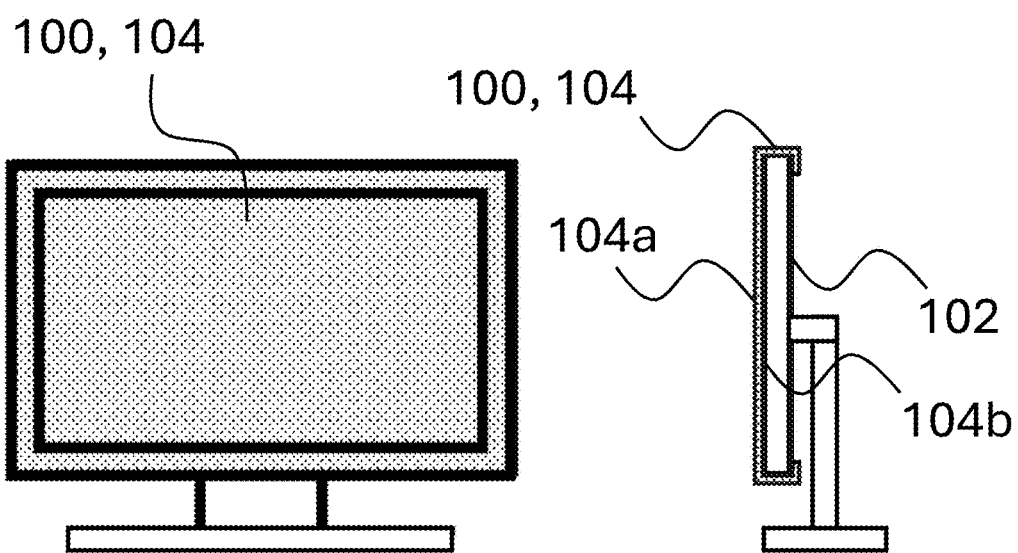
FIG. 2 illustrates the front of the display (in the form of a TV or a monitor) completely covered by a RPD device of the present invention.
FIG. 3 is a side-cross sectional view of the display (in the form of a TV or a monitor) covered by a RPD device of the present invention.

Referring now to the drawings, 1 FIG. 1 illustrates a front of a display (in the form of a TV or a monitor) partially covered by a RPD device of the present invention. FIG. 2 illustrates the front of the display (in the form of a TV or a monitor) completely covered by a RPD device of the present invention. FIG. 3 is a side-cross sectional view of the display (in the form of a TV or a monitor) covered by a RPD device of the present invention.

According to some embodiments of the present invention, a RPD device 100 is provided for a display 102. The RPD device 100 includes a compliant/flexible white cloth sheet 104 having an inner surface 104*a* and an outer surface 104*b*. The white cloth sheet 104 is placed in front of the display with the inner surface in contact with a front of the display, so as to absorb light emitted by the display 102 behind inner surface 104*a* and to display the light absorbed on the outer surface 104*b* to be viewed ahead of the display, without distortion of the intended image and maintaining the quality of the image.

When the cloth sheet is taut against the front of display 102, the cloth sheet 104 attenuates light pollution in the room and attenuates light rays directly reaching to the viewer. The RPD device 100 utilizes a rear projection effect (projection of an image from the rear) allowing for the use the full brightness of the display, while at the same time allowing for a more relaxed viewing experience while retaining the intended vibrancy of the color, much like a regular frontal projection view would be, for example in a cinema. Rear illumination allows a viewer to watch the image generated by the display while standing directly in front of the display, without causing a shadow that would normally be cast from a projector in a frontal projection setting. The use of the RPD device 100 of the present invention enhances the viewing experience of a person watching a video or images in the dark by reducing the direct light exposure from the screen significantly, while still maintaining a high-definition and detailed view of the image. The viewer views the images projected onto the RPD device as indirect light displayed on the RPD device. Light from the display is absorbed by the inner (rear) surface of the RPD device and displayed on the (outer) front surface thereof.

The cloth sheet 104 is white and dense enough and thick enough to allow the light to fill each small space. Fabric that is too light, thin, or transparent allows light emitted from the display to penetrate the cloth sheet and directly reach the viewer's eyes. The cloth sheet 104 of the present invention is dense enough to absorb the light emitted by the display. In a non-limiting example, the density of the cloth sheet is between about 75 and about 250 grams per square meter (gsm). An example of a subrange of the thickness of the cloth sheet is about 100-200 gsm, for example about 90 gsm. In a non-limiting example of the present invention, the thickness of the cloth sheet is between about 1 mm and about 10 mm. An example of a subrange of the thickness of the cloth sheet is about 3-4 mm. It should be noted that all measurements may have an error of +15%. It should be understood that the word "white" refers to any shades and hues of white, and may include, in non-limiting examples, colors known as pure white, off white, white smoke, eggshell, daisy, porcelain, pearl, and chiffon.

The cloth sheet 104 is flexible and elastic. The cloth sheet may be single stretch fabric that stretches elastically in one direction but not the other. For example, the cloth sheet 104 may be stretchable horizontally and non-stretchable vertically. Alternatively, the sheet 104 may be stretchable vertically and non-stretchable horizontally. In some embodiments of the present invention, the sheet is bi-stretchable, i.e. elastically stretchable in the first direction and in the second direction perpendicular to the first direction.

The RPD device 100 is adaptable and removable to be easily placed on and off the display without harming the display. When not in use, the RPD device of the present invention can be rolled up like a sock and put into a pouch until next use. Moreover, the cloth sheet 104 has minimal creasing when crumpled up. When stretched again (after crumpling), whatever minimal creases were created are not visible. For this reason, harder materials (such as canvas), which are the standard for projection viewing, are not used as the cloth sheet 104 of the RPD device 100 of the present invention. Harder materials are more difficult to properly tension, and when not in use cannot be bundled up and stored as easily as the present invention. Moreover, harder materials crease significantly when crumpled.

It should be noted that the RPD device 100, when taut, can also be used for receiving images from a front projector located ahead of the front surface of the RPD device 100. For example, the RPD device 100 may be placed over a display (e.g., a TV) to maintain the RPD device 100 taut. The display is off. A front projector, such as a mini projector emits light which is displayed on the front surface of the RPD device 100, and can be viewed by a viewer.

For the above-mentioned reasons, the cloth sheet 104 may include a first fabric which includes one or more of the following first fabrics: viscose, bamboo, nylon, tnt, cotton, polycotton, polyester, polypropylene, rayon, or nylon wool. In a non-limiting example, the cloth sheet 104 includes 80%-100% of the first fabric and 0%-20% elastane by weight. In a non-limiting example, the cloth sheet 104 includes 90%-99% of the first fabric and 1%-10% of elastane by weight.

In some embodiments of the present invention, the first fabric includes cotton and forms 96-98% of the cloth sheet 104, while elastane forms 2-4% of the cloth sheet 104. Non limiting examples of the cloth sheet in which the first fabric is cotton may include:
  a. poplin, 1/1 weave ratio, NE 50/1×50/1+d40, 53×27, weight 105 gsm, 97% cotton+3% elastane;
  b. poplin, 1/1 weave ratio, NE 60/1×60/1, 66×27, weight 102 gsm, 97% cotton+3% elastane;
  c. sateen, 4/1 weave ratio, NE 60/1×60/1+d30, 78×33, weight 117 gsm, 97% cotton+3% elastane;
  d. twill, 2/1 weave ratio "S", CM30×CD24+D70, 36×24, weight 168 gsm, 97% cotton+3% elastane;
  e. twill, 2/1 weave ratio "S", CM30×CD24+D70, 36×24, weight 168 gsm, 96% cotton+4% elastane, tumbled.

In some embodiments of the present invention, the RPD device 100 includes a fastening element to removably fasten the cloth sheet 104 to the display 102 and keep the cloth sheet 104 taut in front of the display and in direct contact a front of the display while fastened to the display. Keeping the cloth sheet taut is advantageous, as empty space between the cloth sheet and the front of the display may cause bubbling of the cloth sheet, which would reduce the quality of the image reached by the user.

Figure 20:
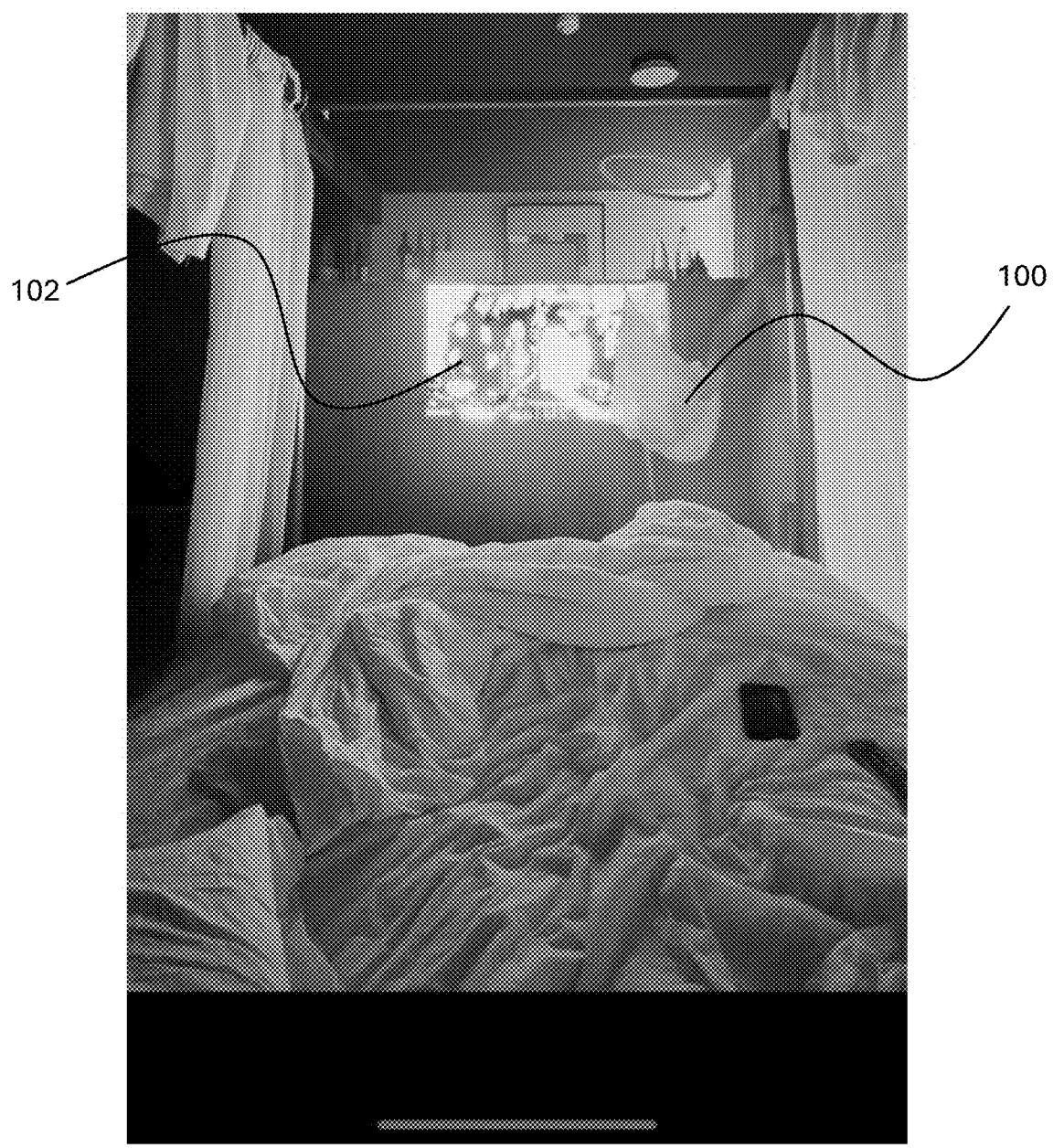
FIG. 20 is a photograph of a television screen not covered by a RPD device of the present invention.
Figure 21:
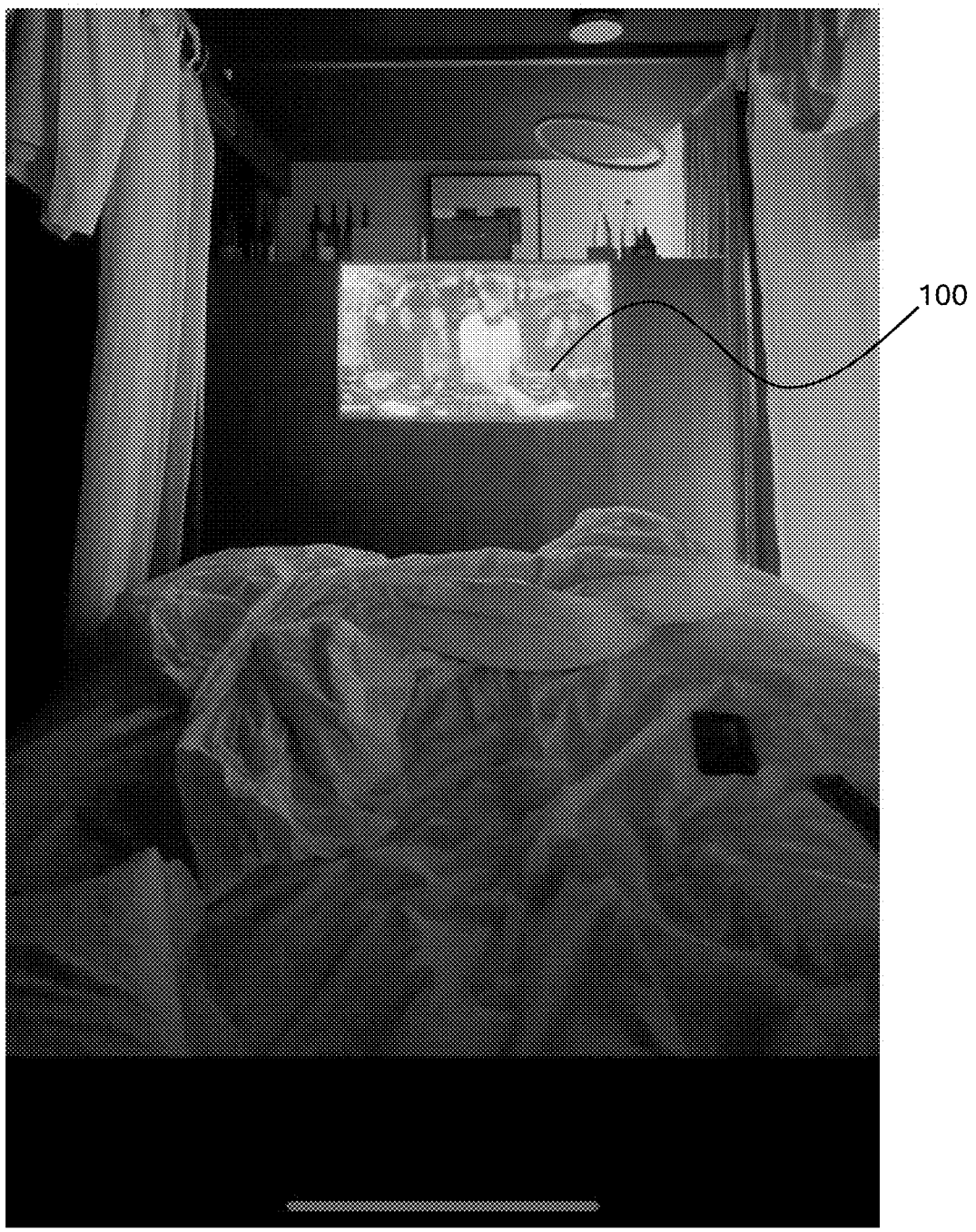
FIG. 21 is a photograph of the same television screen covered by a RPD device of the present invention.
Figure 22:
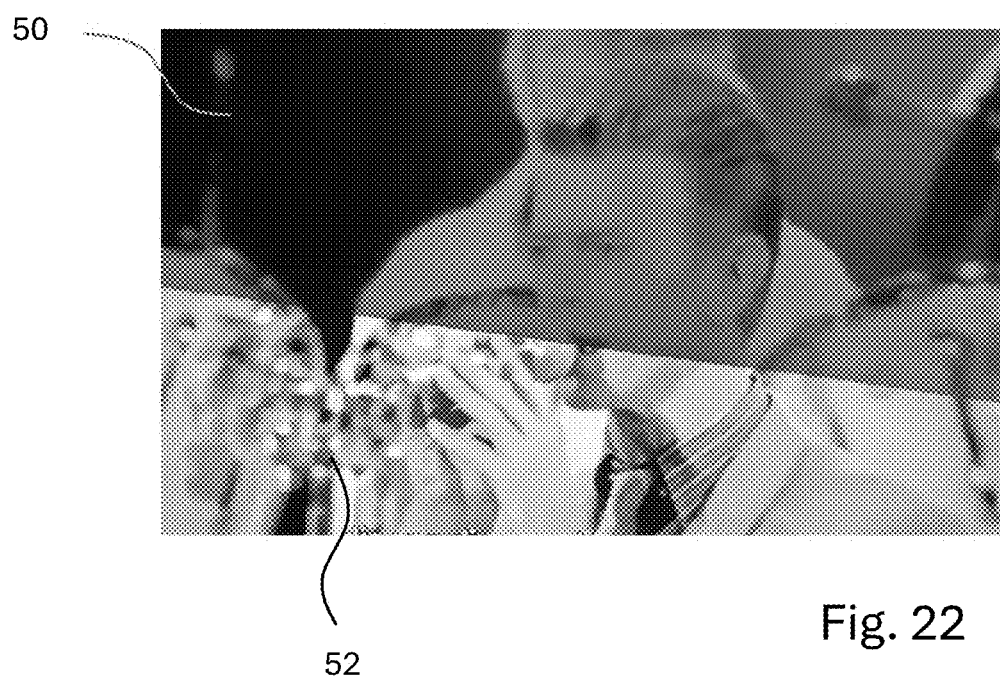
FIG. 22 is a photograph showing a television screen partially covered by the RPD device of the present invention.
Figure 23:
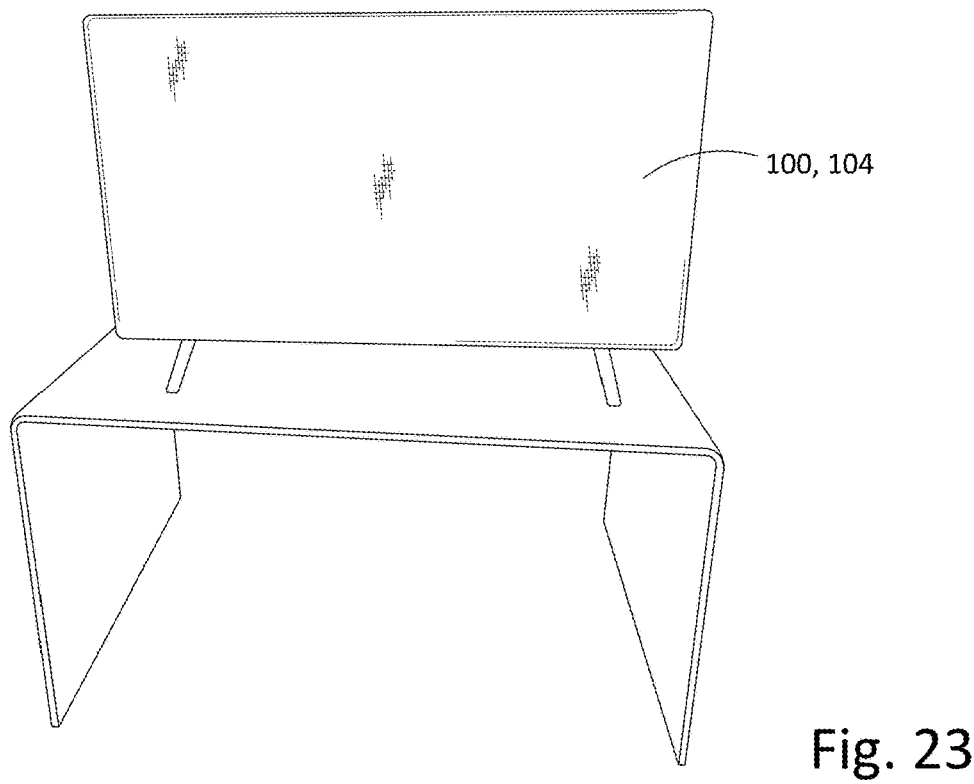
FIGS. 23-31 show different views of the RPD device joined to a television, according to some embodiments of the present invention.
Figure 24:
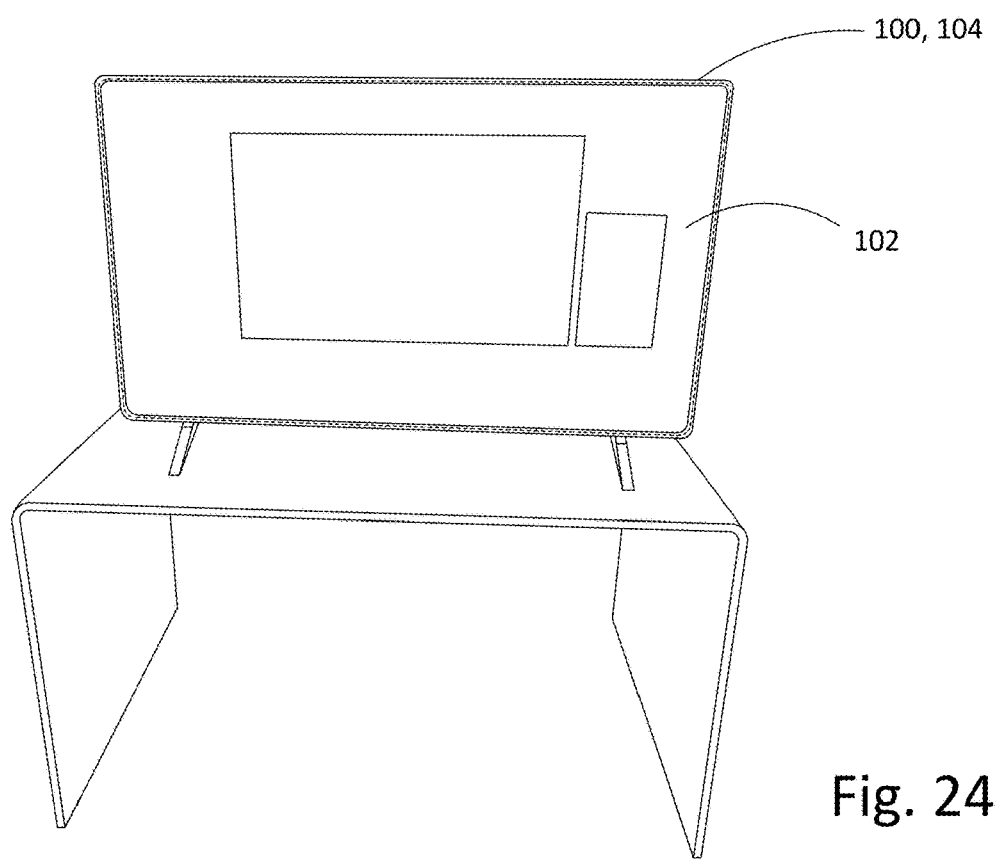
Figure 25:
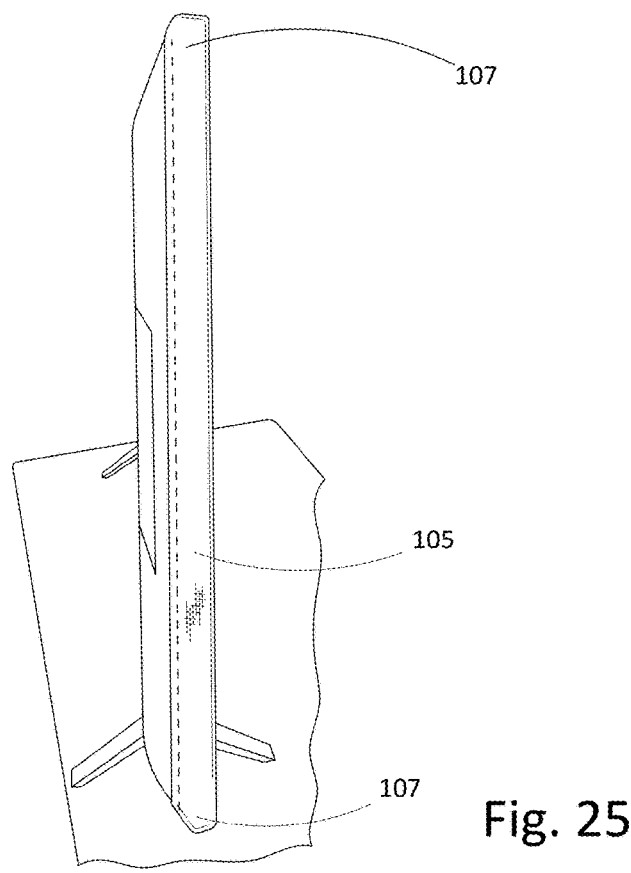
Figure 26:
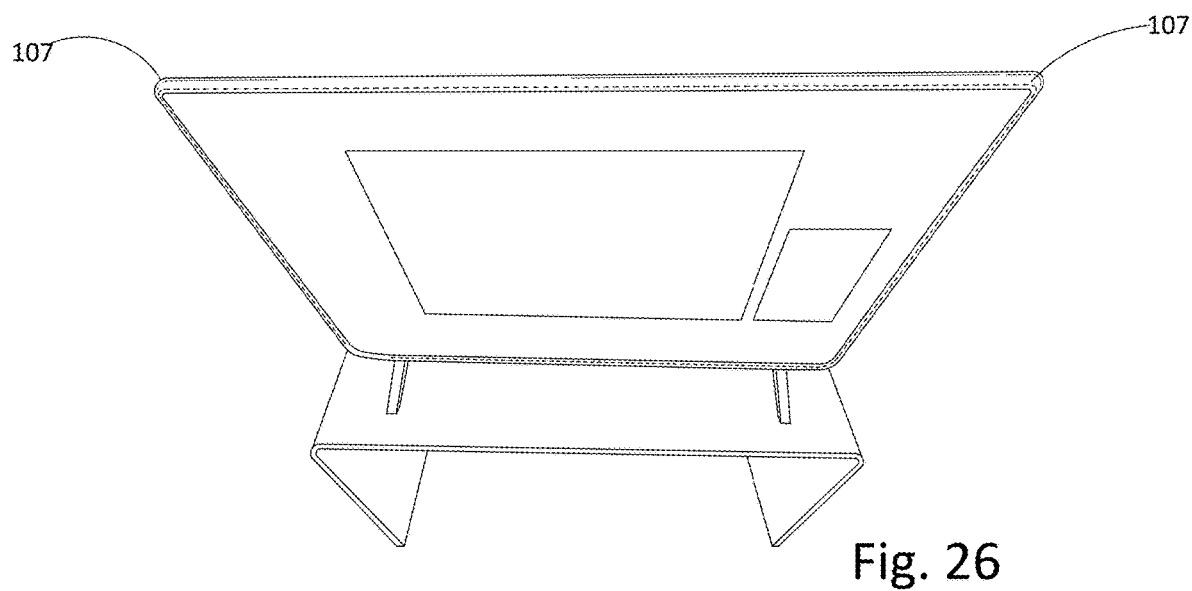

FIG. 20 is a photograph of a television (display 102) not covered by the RPD device 100 of the present invention. FIG. 21 is a photograph of the same television covered by the RPD device 100 of the present invention. FIG. 22 is a photograph showing a television screen partially covered by the RPD device of the present invention.

Comparing FIGS. 20 and 21, It can be seen that in FIG. 21, the image projected by the television screen to the viewer via the RPD device 100 retains good quality, while light pollution to the room and light exposure to the viewer are reduced compared to FIG. 20, in which the light is very bright, produces a high level of light illuminating the room, and has a high level of blue light. FIG. 22 shows the difference between a direct image 50 emitted directly by the television screen and a projected image 52 projected via the RPD device. The projected image 52 is softer and easier on the eye than the direct image 50.

Figure 32:
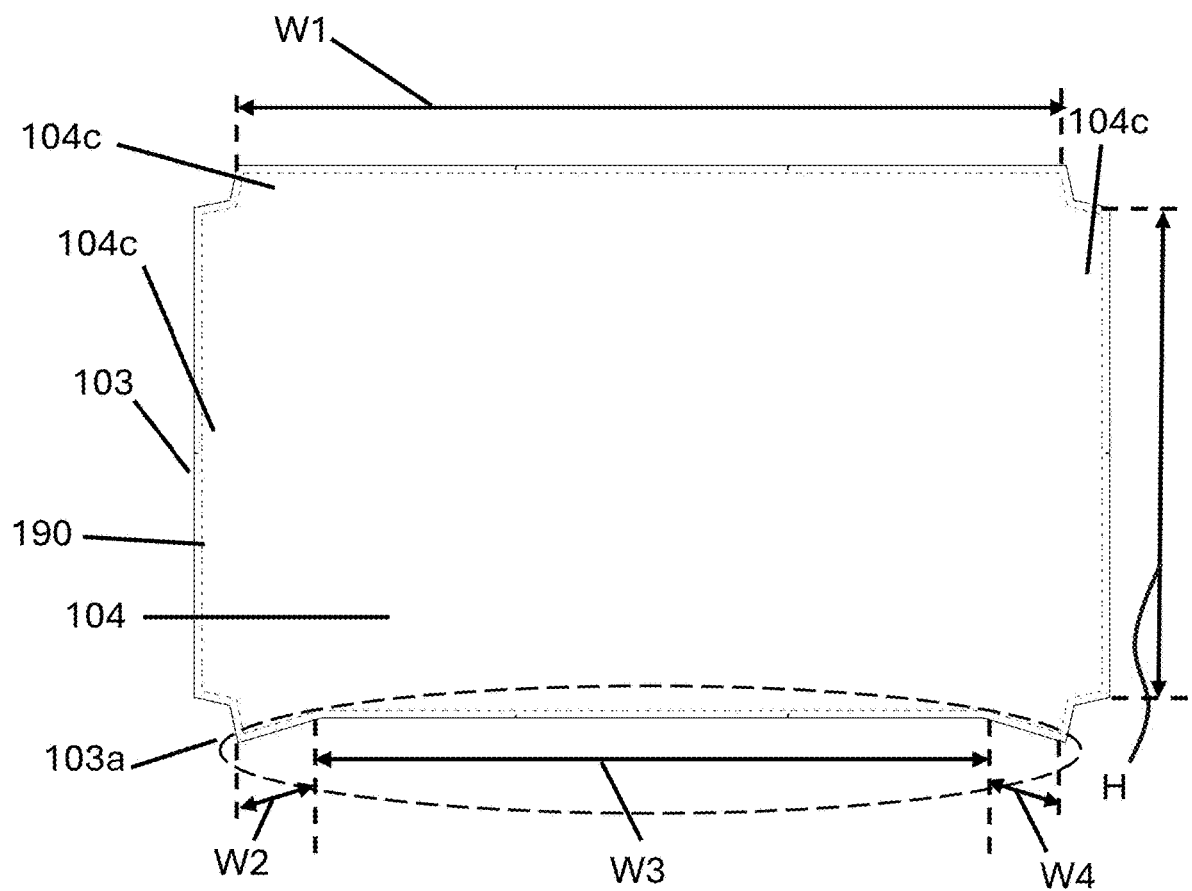
FIG. 32 shows an example of the shape of a cut of the cloth sheet of the RPD device in an open configuration, according to some embodiments of the present invention.
Figure 38:
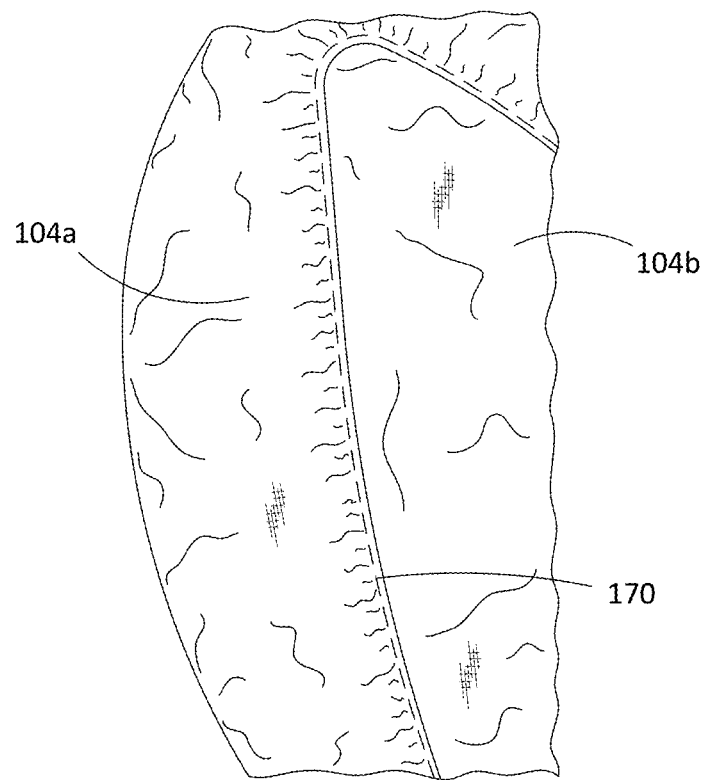
FIGS. 38-40 show the RPD device after the cut cloth sheet has been sewn to an elastic band, according to some embodiments of the present invention.
Figure 39:
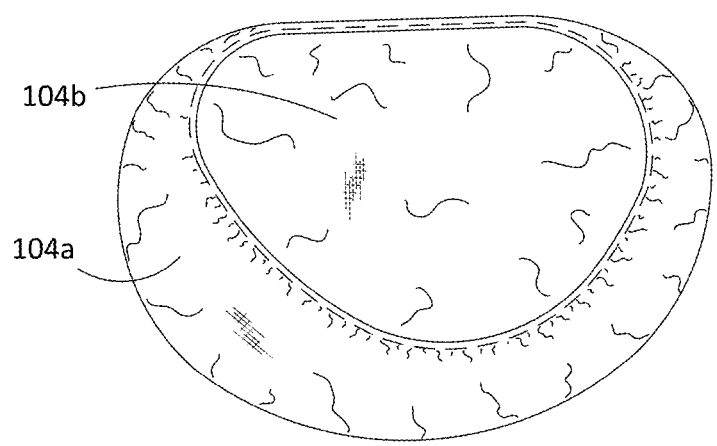
Figure 40:
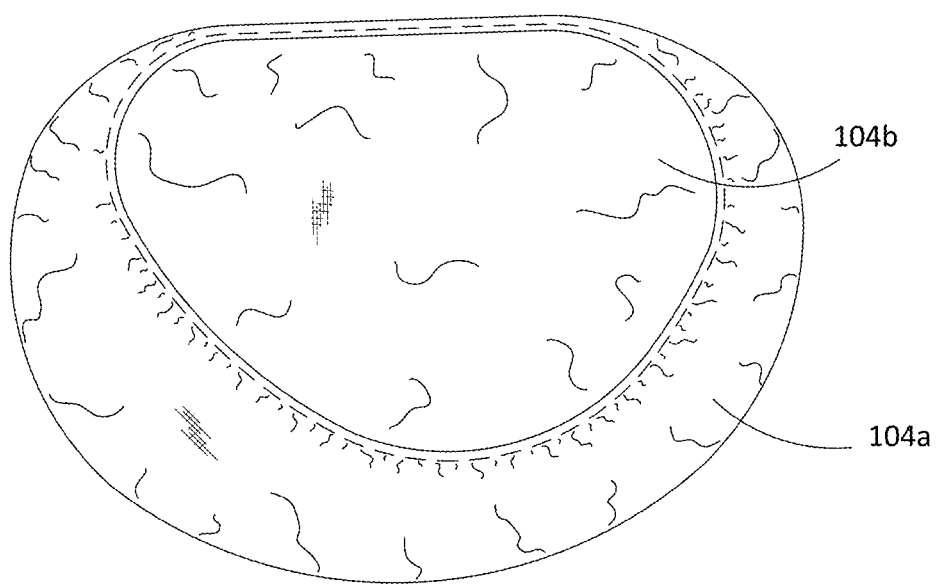

FIGS. 23-31 show different views of the RPD device joined to a television, according to some embodiments of the present invention. FIG. 32 shows an example of the shape of the cut of the cloth sheet of the RPD device in an open (flat) configuration thereof. FIGS. 38-40 show the RPD device after the cut cloth sheet has been sewn to an elastic band.

The cut of the cloth sheet is important as the geometry of the cut ensures that the RPD device 100 of the present invention fits properly onto the display 102. It should be understood that the cut and geometry of the cloth sheet is customized for the intended display. For example, the dimensions of a cloth sheet for a 40-inch display are different than the dimensions of a cloth sheet for a 48-inch display. The RPD device 100 is not a one-size-fits-all device.

In some embodiments of the present invention, an elastic band 170 is an elastic loop which is joined to the cloth sheet and runs along the perimeter 103 of the cloth sheet 104, but has an equilibrium length that is shorter than the perimeter 103. In this manner, a pocket region 105 is created at the edges of the cloth sheet, or at least four pockets 107 are created at four corners of the cloth sheet to match the four corners of the display 100. In this manner, the RPD device 100 of the present invention can be joined to a display 102 by stretching the elastic band so that the elastic bands clears the perimeter of the display and contacts the rear of the display while the front of the display is covered by the cloth sheet 102. The elastic band 170 may have a coefficient of elasticity as high or higher than the coefficient of elasticity of the cloth sheet. In this manner, the cloth sheet 102 is taut and in contact with the front of the display via elastic force.

In some embodiments of the present invention, the perimeter of the cloth also includes, in the lower section of the cloth, an internally rounded or bending cut/shape 103*a* to eliminate unnecessary fabric and remove any obstruction from the stands/legs (which some display as tv or computer monitors may have) of the display, so as to not cause the cloth sheet to bunch up thus resulting in air gaps along the bottom of the display device. This is shown, for example in FIGS. 29-31. The term "internally", herein, means "toward the center of the cloth sheet".

Figure 27:
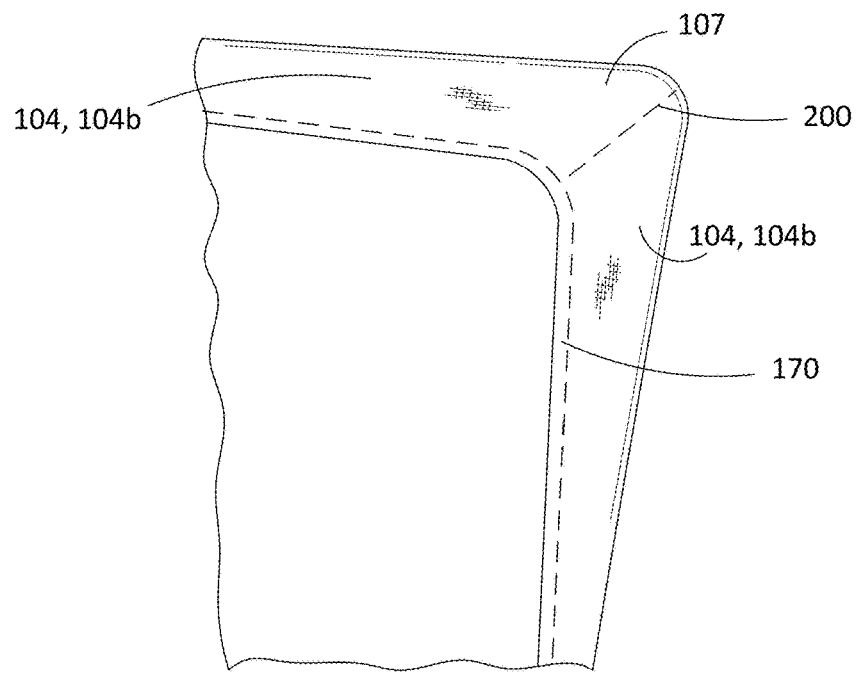
Figure 28:
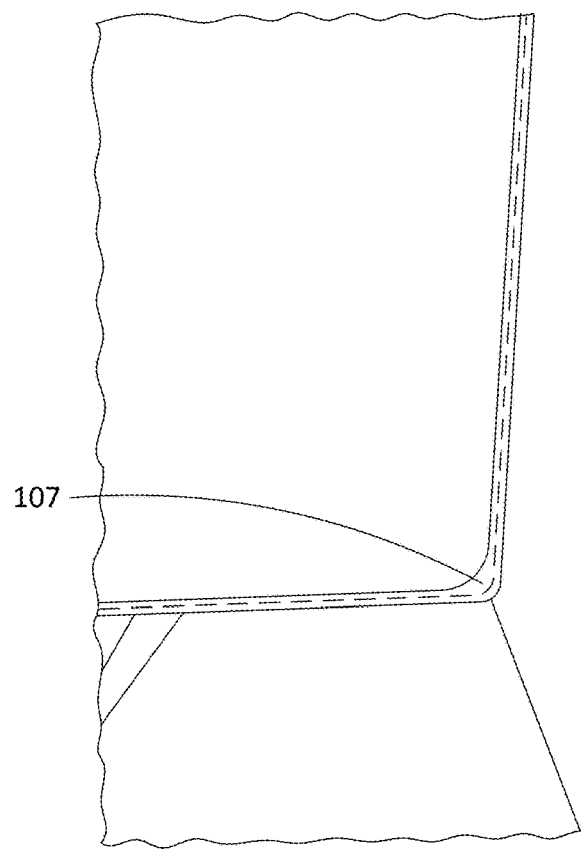
Figure 29:
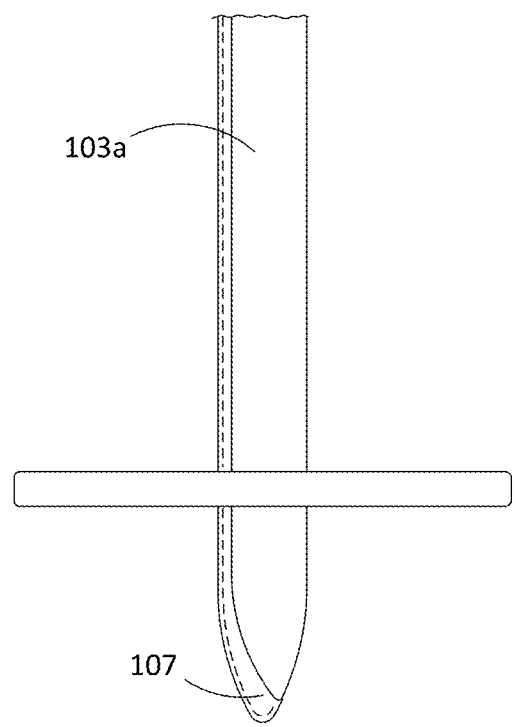
Figure 30:
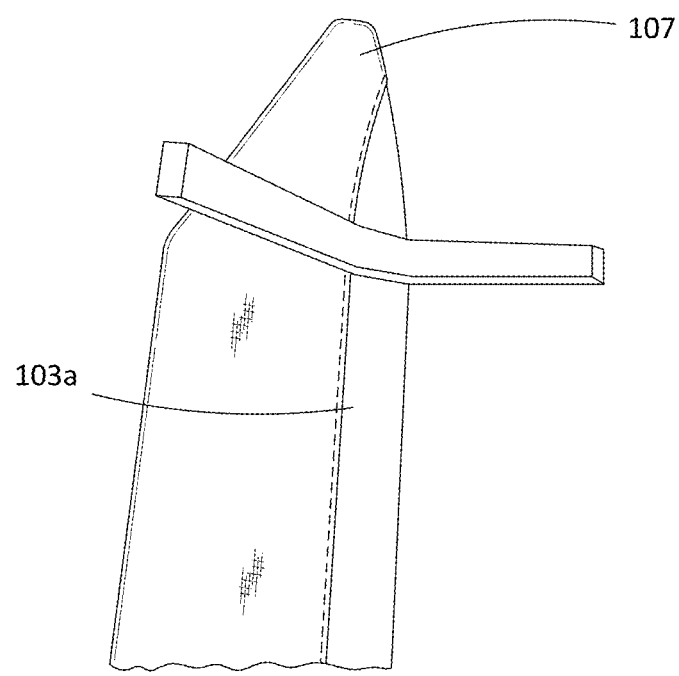
Figure 31:
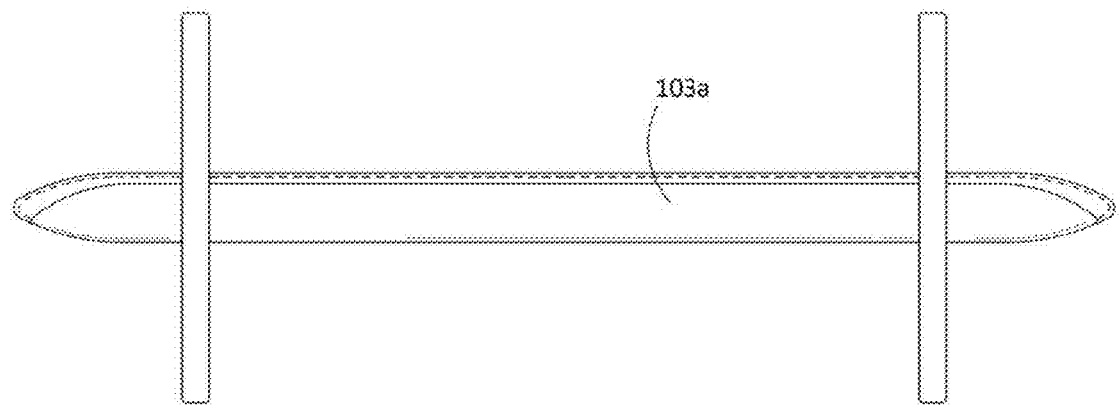

As seen in FIG. 32, in some embodiments of the present invention, the cloth sheet has flaps 104*c* at four sides thereof in the open configuration. The flaps are folded inwards and adjacent flaps have sides that are sewn together. The elastic band is joined to the closed flaps near or at the external edges of the flaps. The location of the elastic band is shown as the dotted line 190 extending parallel to and near the perimeter 103 of the cloth sheet. Because the equilibrium length of the elastic band is considerably smaller than the perimeter of the closed cloth sheet, a fitted shape is generated that enables the cloth sheet to grasp the display from the rear while taut along the front of the display. A seam 200 joining two adjacent flaps together is shown in FIG. 27. In a non-limiting example, the width of each flap measures about 1-10 centimeters, while the distance between the dotted line 190 and the perimeter 103 is about 1-6 centimeter or less. The width of the elastic and may be about 0.5-3 centimeters, for example. All the measurements may have an error if 15%, In some embodiments of the present invention, the dimensions of the flaps 103*c* are W1, W2, W3, W4, H, as shown in FIG. 32. The perimeter 103 of the closed cloth sheet is (with the flaps joined together, before the elastic band is joined to the closed sheet) is W1+W2+W3+W4+2H. In a non-limiting example, the equilibrium (unstretched) length of the elastic band is about 25-50% of the perimeter 103. In a non-limiting example, for a 50-inch TV, the perimeter 103 is about the same as (within 10% of) the perimeter of the TV, i.e. 380 cm. The perimeter 103 may be slightly smaller (within 10%) of the perimeter of the TV. The equilibrium (unstretched) length of the elastic band is about 140 cm, which is about 37% of the perimeter 103. It should be noted that these numbers are non-limiting examples, and the scope of the present invention extends to cloth sheets and elastic bands having different dimensions that enable the generation of the fitted shape that enables the cloth sheet to grasp the display from the rear while taut along the front of the display.

Figure 33:
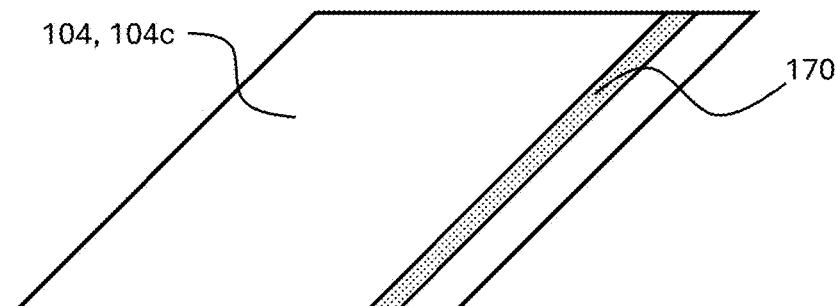
FIGS. 33-37 illustrate an edge of the cloth which is folded over itself to retain an elastic band, according to some embodiments of the present invention.
Figure 34:
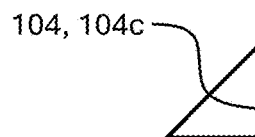
Figure 35:
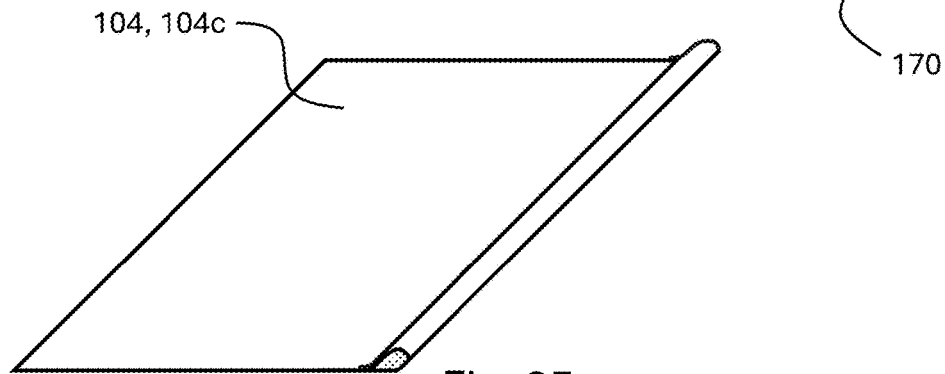
Figure 36:
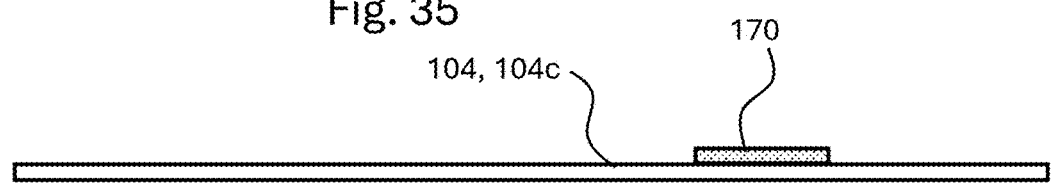
Figure 37:
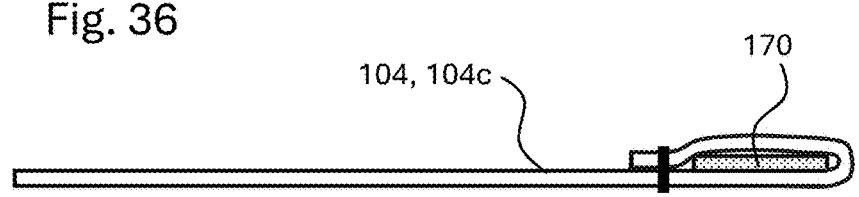

FIG. 33 shows a portion of the cloth sheet 104 in an open (flat) configuration, for receiving the elastic band 170. FIG. 34 shows a portion of the cloth sheet being folded upon itself over the elastic band 170. FIG. 35 shows the cloth sheet 104 where the external portion of the cloth sheet is folded upon itself thereby enclosing the elastic band 170. FIG. 36 shows a close-up of a side view of the cloth sheet 104 in an open (flat) configuration. FIG. 37 shows a close-up of a side view of the cloth sheet 104 having an external potion folded on itself around the elastic band 170 and sewn to itself, thereby creating an enclosure at the perimeter 103 to enclose the elastic band 170.

As seen in FIGS. 33-37, in some embodiments of the present invention, the elastic band 170 is joined to the cloth sheet 104 (for example, to a flap 104c of the cloth sheet 104) by folding the cloth sheet 104 on itself around the elastic band 170 and by sewing the cloth sheet to itself, thereby enclosing the elastic band 170 inside the fold.

The cloth sheet may include synthetic fabric, such as polyester or rayon or nylon, which is very susceptible to electrostatic induction. The cloth sheet could be, but is not limited, to 80-100% of a first fabric formed by synthetic material—which is prone to become electrostatically induced (such as polyester, rayon, or nylon wool)—and 0-20% elastane. In a non-limiting example, the cloth sheet 104 includes 90%-99% of the first fabric and 1%-10% of elastane by weight.

A non-limiting example of a weave of the cloth sheet is: 50 d/75 d+40 d, 272×94, 95% polyester and 5% elastane. The weave may be 4/1 (sateen weave) and a density of 90 gsm; single stretch cloth.

In a further, non-limiting example, the waeve of the cloth sheet is the following:
Construction: Sateen
Composition: 95% polyester and 5% elastane
Yarn count-Warp: Ne 50 D Semi-dull yarn
Yarn count-Weft: Ne 75 D+40 D
Thread count-Warp: 111 yarns/cm
Thread count-Weft: 37 yarns/cm
Weight: 95 gsm.

It should be noted that all measurements may have an error of ±15%.

The choice of a synthetic fabric prone to become electrostatically induced is important, since once the display is turned on (whether it is a LED, LCD, Plasma, or CRT display), electrical charge builds up on the front of the display, causing charged particles in the cloth sheet to redistribute, so that the charged particles that have a charge that is opposite to the charge on the front of the display move to the inner (rear) surface of the cloth sheet, while charged particles that have a charge that is the same as the charge on the front of the display move to the outer (front) surface of the cloth sheet. This causes the cloth sheet to become attracted to the front of the display. The cloth sheet becomes electrostatically induced in the vicinity of the front of the display, for example, when located within about an inch from the front of the display. The cloth sheet 104 may be pushed by a user, via the hand or applicator tool, such as a flat-edged file, to make contact with the front of the display 102, so that the cloth sheet 104 is flush to the front of the display 102. Once contact occurs, the electrostatic attraction between the inner (rear) surface of the cloth sheet and the front of the display keeps the cloth sheet 104 in contact with the front of the display 102 as long as the display is on. In this manner, no space is formed between the cloth sheet and the front of the display. If a gap were to be formed between the cloth sheet and the front of the display, the gap would reduce the quality of the image viewed by the user.

This feature is particularly useful because some displays include a frame which extends ahead of the plane of the portion of the display which displays images. The cloth sheet 104 stretches along the frame portion, such that a gap is created between the portion of the display which displays images and the cloth sheet 104. Once the display is on, the cloth sheet 104 can be pushed to contact the portion of the display which displays images. Due to the electrostatic attraction between the cloth sheet 104 and the portion of the display which displays images and the flexibility and elasticity of cloth sheet, this contact is maintained and the cloth sheet 104 remains taut against the portion of the display which displays images, as long as the display is on.

This feature is also useful when no frame is present, in order to decrease or eliminate the formation of gaps (air bubbles) between he display and the cloth sheet.

It should be noted that the material forming the cloth sheet may be selected depending on the properties of the display. In fact, some displays (such as OLED displays) create considerable heat upfront while other displays (such as LED and LCD displays) are substantially cooler. An RPD device with a breathable material (such as cotton or a different organic fiber) may be more appropriate to cover warmer displays (such as OLED displays or very large displays), to enable dissipation of heat via the cloth sheet. An RPD device with a synthetic fabric may be more appropriate for displays that do not emit substantial heat, as heat dissipation via the front is not important and the susceptibility of the synthetic material to electrostatic induction helps maintain the sheet in contact with the front of the display to decrease the incidence of bubbling and maintain the quality of the display's image.

Figures 41, 42:
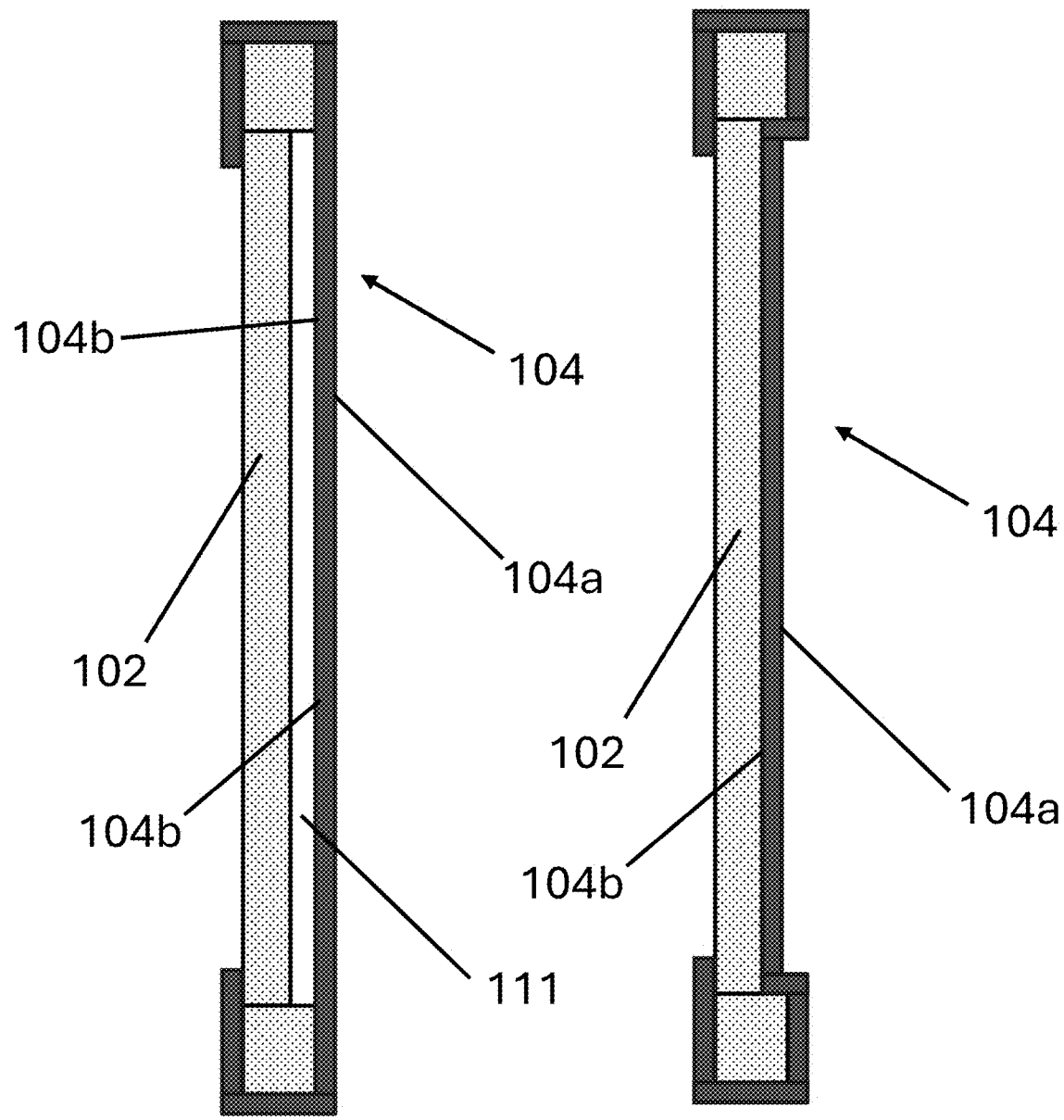

FIG. 41 is a side cross-section illustrating the cloth sheet 104 stretched in front of the display when the display is off, with a gap 111 between the inner surface 104a of the cloth sheet and the front of the display 102. FIG. 42 is a side cross-section illustrating the cloth sheet 104 contacting the display due to electrostatic attraction between the inner surface 104a of the cloth sheet 104 and the front of the display 102 when the display 102 is on.

The elastane material in the cloth sheet of the present invention allows for both expansion and contraction upon placing and holding the RPD device of the present invention in place on the display. Moreover elastane is also prone to become electrically charged and be attracted to the front of the display, similarly to the polyester or synthetic fabric chosen in the device of the present invention.

The cloth sheet 104 has an inner surface 104b and an outer surface 104a, as mentioned above. In some embodiments of the present invention, the inner surface 104b has a smoother finish (due, for example to the 4/1 sateen weave). The inner surface 104b is the surface of the cloth sheet that contacts the front of the display 102 for receiving the image from the display 102. Because of the smoother finish of the inner surface 104b, the cloth sheet's contact to the front of the display is enhanced and fewer gaps (air bubbles) are present between the display 102 and the cloth sheet 104. In this manner, the image quality projected on cloth sheet and viewed from the outer (front) surface 104a of the cloth sheet is enhanced.

It should be noted that the device of the present invention can be inverted front to back, so that the smoother surface of faces outwards. In this manner, a projection screen is created as a viewing surface for traditional projectors. The smoother surface produces a valuable alternative for traditional projection viewing in which the light is bounced back to the viewer.

Figure 43:
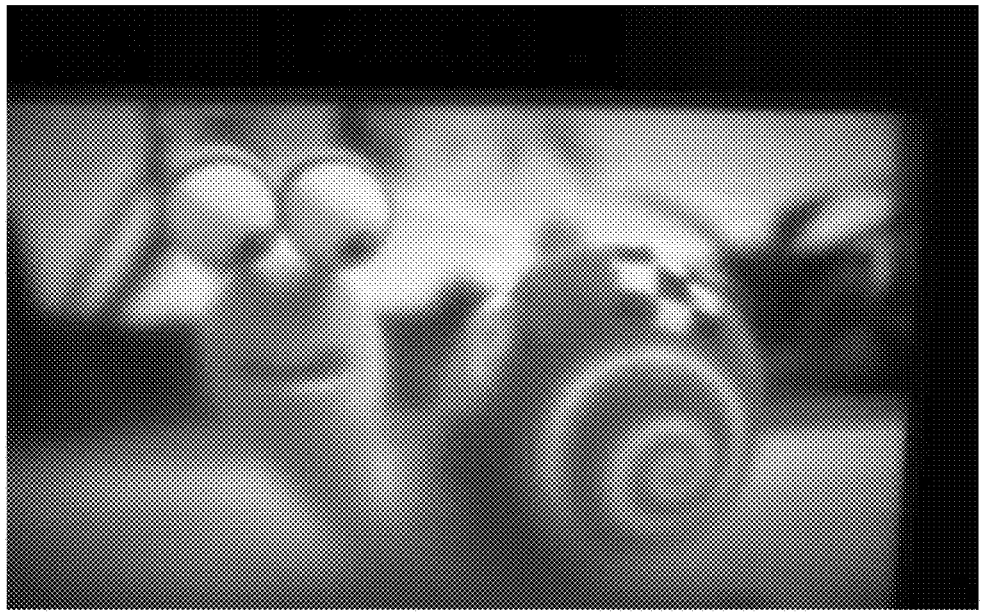
FIG. 43 shows a display covered by an RPD device of the present invention, before the cloth sheet is pushed toward the display.
Figure 44:
FIG. 44 shows a display covered by the RPD device of the present invention, after the cloth sheet has pushed toward the display, as electrostatic force keeps the cloth sheet joined to the front of the display.

FIG. 43 shows a display covered by the device of the present invention, before the cloth sheet is pushed toward the display. FIG. 44 shows a display covered by the device of the present invention, after the cloth sheet has pushed toward the display, as electrostatic force keeps the cloth sheet joined to the front of the display.

Figure 45:
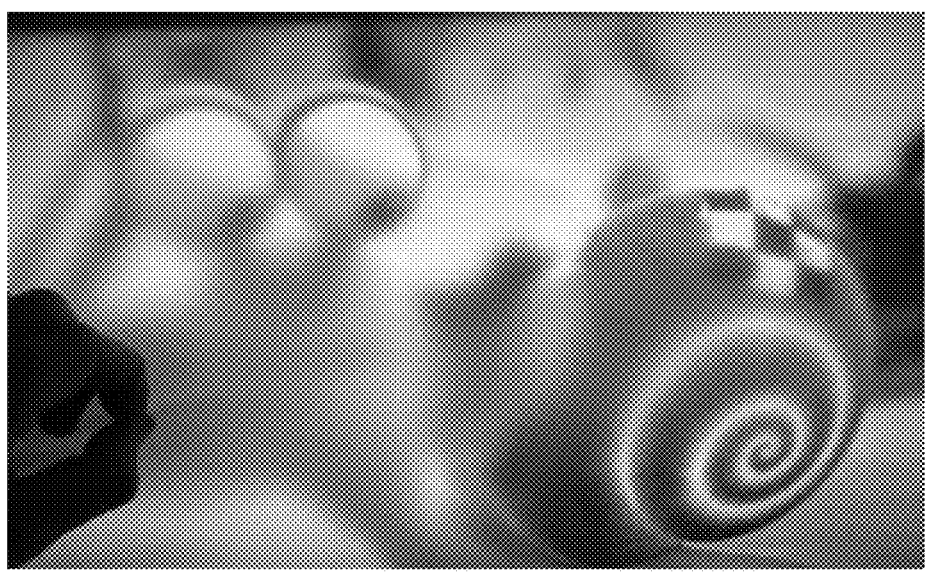
FIG. 45, shows a user pulling a portion of the cloth sheet away from the display.

In FIG. 45, the user pulls a portion of the cloth sheet away from the display. It can be seen, that despite the user's pull, the cloths sheet resists the user's pull and stretches from the front surface of the display, due to the electrostatic attraction of the cloth sheet to the fronts surface of the display.

Figure 4:
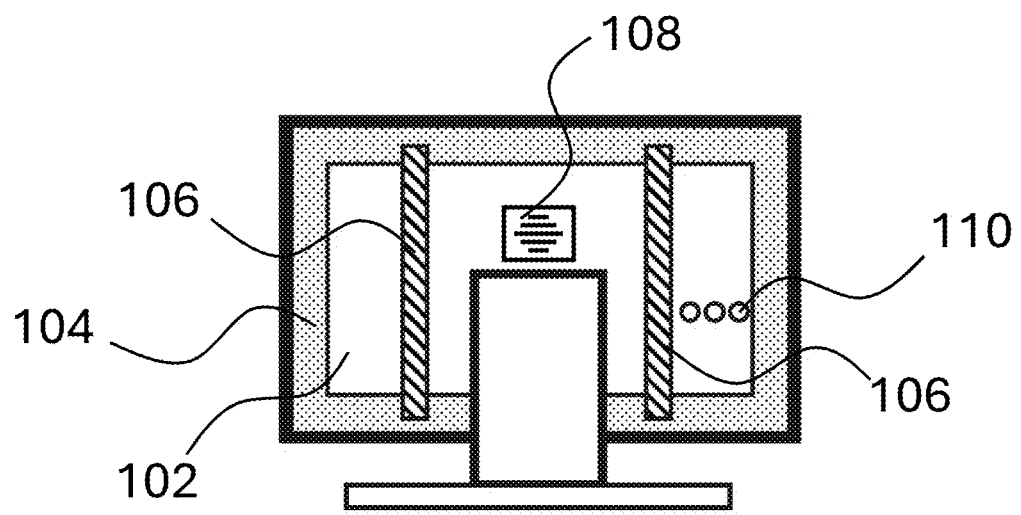
FIG. 4 illustrates the back of a display (in the form of a TV or a monitor) covered by a RPD device having one or more vertical straps, according to some embodiments of the present invention.
Figure 5:
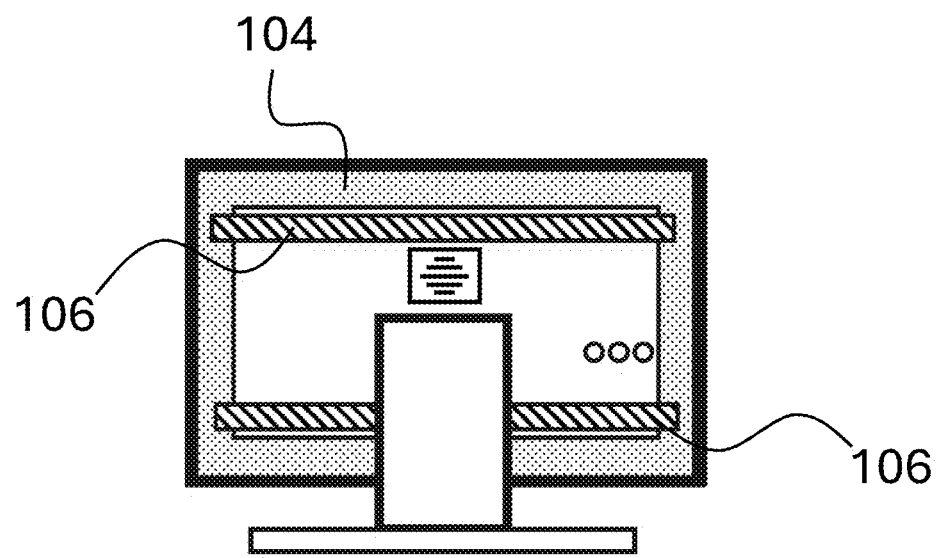
FIG. 5 illustrates the back of a display (in the form of a TV or a monitor) covered by a RPD device having one or more horizontal straps, according to some embodiments of the present invention.

FIG. 4 illustrates the back of a display 102 (in the form of a TV or a monitor) covered by a RPD device 100 having one or more vertical straps, according to some embodiments of the present invention. FIG. 5 illustrates the back of a display (in the form of a TV or a monitor) covered by a RPD device having one or more horizontal straps, according to some embodiments of the present invention.

The fastening element may include at least one strap 106 joined to the cloth sheet 104. If the cloth sheet 104 includes an elastic band 170 as described before, the at least one strap 106 may be joined to the elastic band 170 or the portion of the cloth sheet that is sewn around the elastic band 170. In use, the cloth sheet 104 covers the front of the display 102, while leaving an opening at a rear of the display 102. Each strap extends along the rear of the display 102 and is connected to the cloth sheet 104 at two edges of the opening.

The strap 106 may be elastic and may have a coefficient of elasticity as high or higher than the coefficient of elasticity of the cloth sheet. In this manner, the strap is configured to keep the front portion taut and in contact with the front of the display via elastic force.

In some embodiments of the present invention, the strap may be vertical (FIG. 4) or horizontal (FIG. 5). In some embodiments, the strap's orientation is parallel to the direction in which the cloth sheet is stretchable. In this manner the strap's pull stretches the cloth sheet 104 and keeps the cloth sheet taut against the front of the display.

The opening of the RPD device 100 at a rear of the display 102 enables heat dissipation of the display 102, preventing the display from overheating. For example, the display may have a vent 108 or a heat exchanger surface in the rear of the display. Moreover, some televisions and monitors include sockets 100 at the rear of the display for connecting the televisions or monitors to signal sources or power sources. The opening of the RPD device enables access to the sockets 110.

Figure 6:
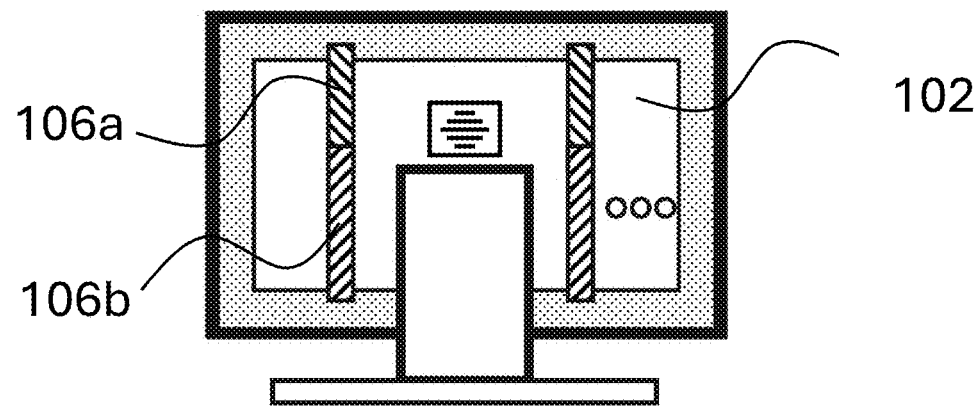
FIG. 6 illustrates the back of a display (in the form of a TV or a monitor) covered by a RPD device having one or more straps, in which each straps includes two segments removably joinable to each other, according to some embodiments of the present invention.
Figure 7:
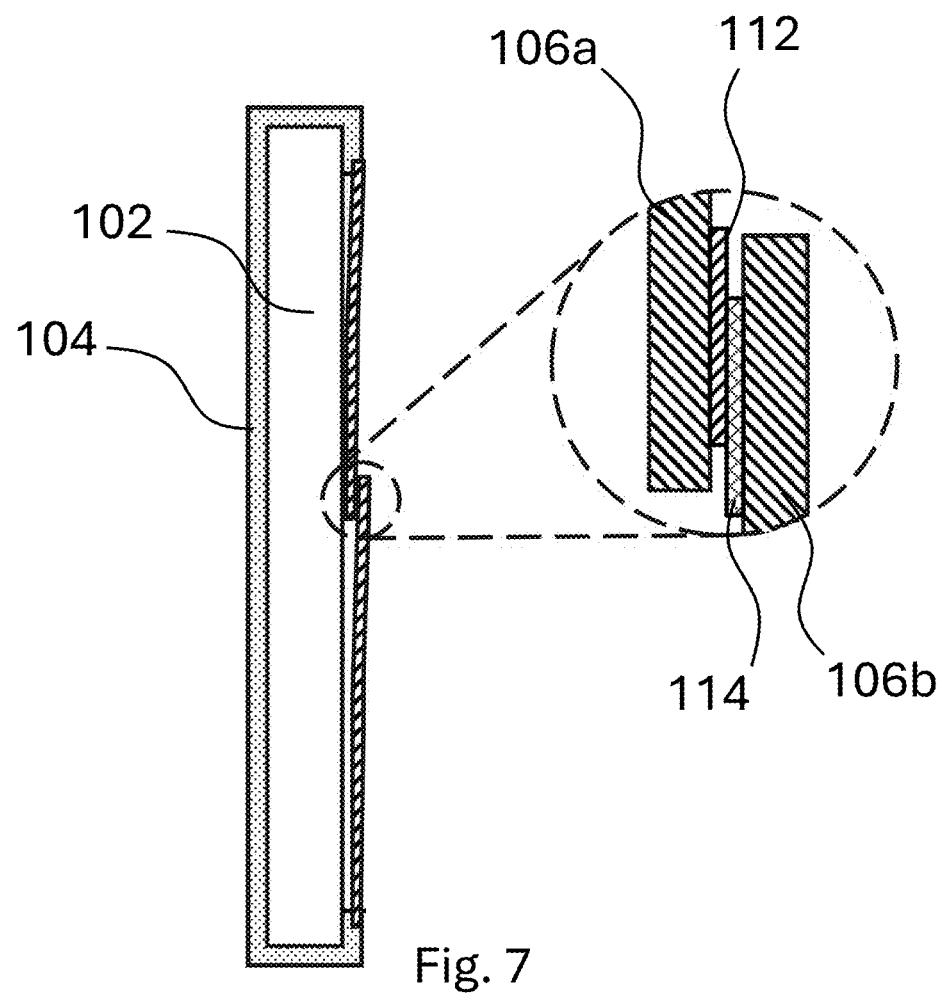
FIG. 7 is a side view of a display (in the form of a TV or a monitor) covered by a RPD device having one or more straps, in which each straps includes two segments removably joinable to each other, according to some embodiments of the present invention.

FIG. 6 illustrates the back of a display (in the form of a TV or a monitor) covered by a RPD device having one or more straps, in which each straps includes two segments removably joinable to each other, according to some embodiments of the present invention. FIG. 7 is a side view of a display (in the form of a TV or a monitor) covered by a RPD device having one or more straps, in which each straps includes two segments removably joinable to each other, according to some embodiments of the present invention.

In some embodiments of the present invention, the strap 106 includes two segments 106a and 106b joined to the cloth sheet at opposite edges of the opening. The segments 106a and 106b have respective securing mechanisms configured to cooperate with each other to secure the segments together at a desired location along the segments. The segments may or may not be elastic.

In the non limiting example of FIG. 7, the securing mechanisms may include a hook-and-loop fastener. The hook portion 112 is fixed to the first segment 106a, while the loop potion 114 is fixed to the second segment 106b. By joining the first segment 106a to the second segment 106b at a desired location, the cloth sheet 104 is stretched over the front of the display 102.

It should be noted that a different type of securing mechanism may be used. For example, the first segment may have a belt buckle while the second segment may have one or more punch holes for cooperation with buckle. Alternatively, the first segment may include a ratchet belt buckle to removably secure the second segment to the first segment.

Figure 8:
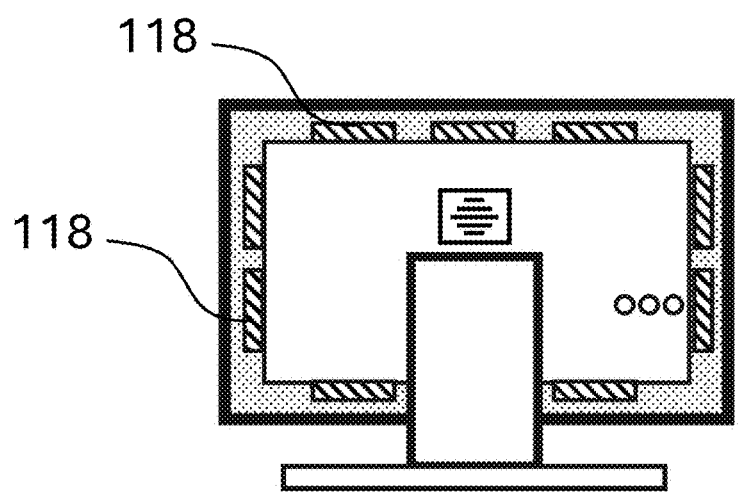
FIGS. 8 and 9 illustrates, respectively, the back and the side of a display (in the form of a TV or a monitor) covered by a RPD device, wherein the RPD device includes securing units configured to be removably joined to respective securing units fixedly joined to the rear of the display, according to some embodiments of the present invention.
Figure 9:
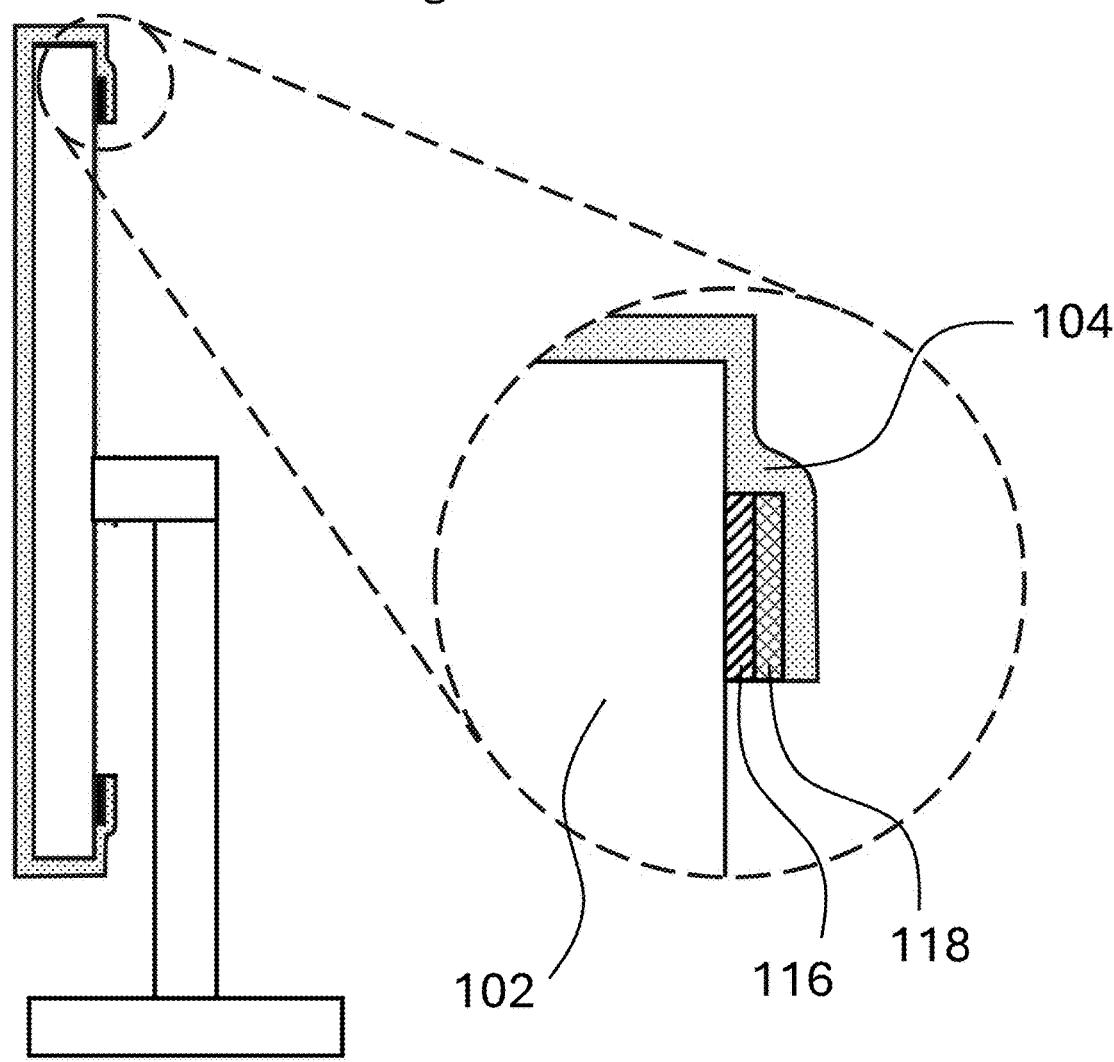

FIGS. 8 and 9 illustrate, respectively, the back and the side of a display (in the form of a TV or a monitor) covered by a RPD device, wherein the RPD device includes securing units configured to be removably joined to respective securing units fixedly joined to the rear of the display, according to some embodiments of the present invention.

In some embodiments of the present invention the fastening element includes a plurality of first securing units and a plurality of second securing units. The first securing units 116 are configured to be fixedly joined to a back of the display 102. The second securing units 118 are fixedly joined to the cloth sheet 104 and are removably joinable to the first securing units 116 to removably secure the RPD device to the display 102. The first and second securing units may include hook-and-loop fasteners.

The first securing units may be joined to the display 102 by adhesive, for example. The cloth sheet 104 is joined to the display by joining the second securing elements 118 to the respective first securing elements 116.

Figure 10:
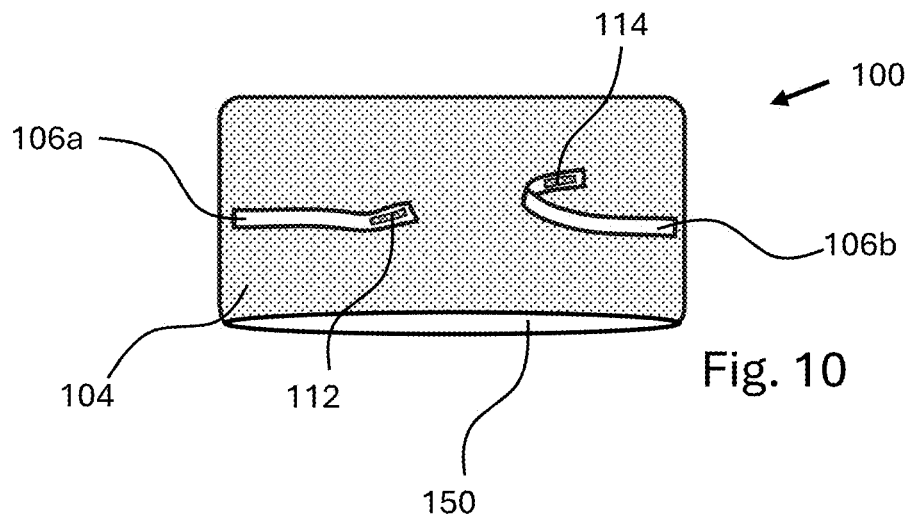
FIG. 10 is a front view of a sleeve-like RPD device for a computer monitor, according to some embodiments of the present invention.
Figure 11:
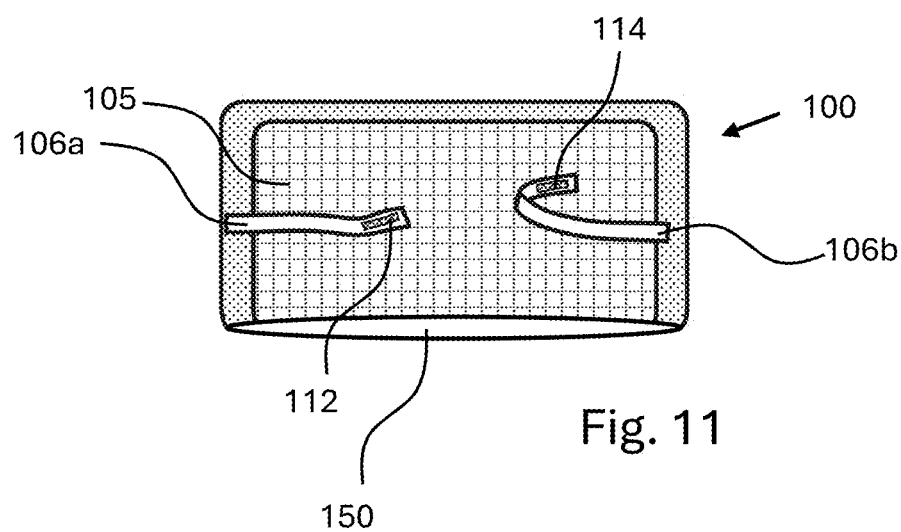
FIG. 11 is a rear view of a sleeve-like RPD device for a computer monitor, wherein the RPD device has an elastic fabric covering most of the rear portion of the RPD device, according to some embodiments of the present invention.
Figure 12:
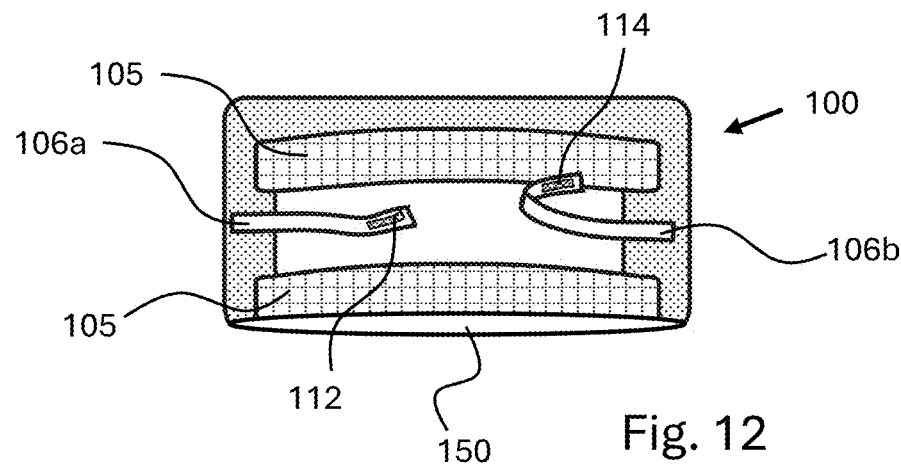
FIG. 12 is a rear view of a sleeve-like RPD device for a computer monitor, wherein the RPD device has an elastic fabric covering a part of the rear portion of the RPD device, according to some embodiments of the present invention.
Figure 13:
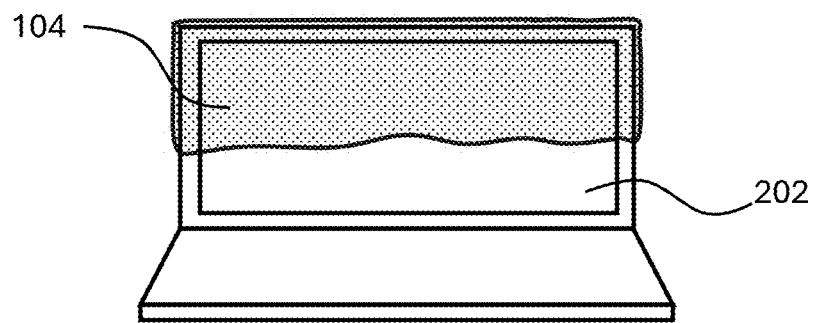
FIG. 13 illustrates the front of a laptop monitor partially covered by a sleeve-like RPD device of the present invention.
Figure 14:
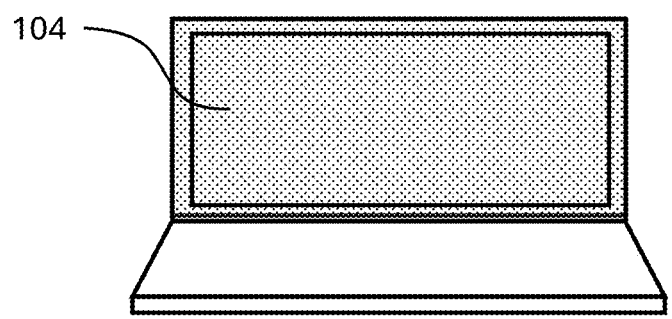
FIG. 14 illustrates the front of the laptop monitor completely covered by the sleeve-like RPD device of the present invention.
Figure 15:
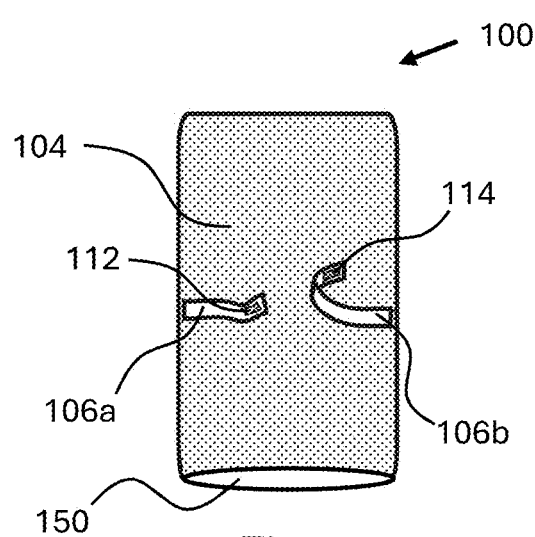
FIG. 15 is a front view of a sleeve-like RPD device for a smart phone, according to some embodiments of the present invention.
Figure 16:
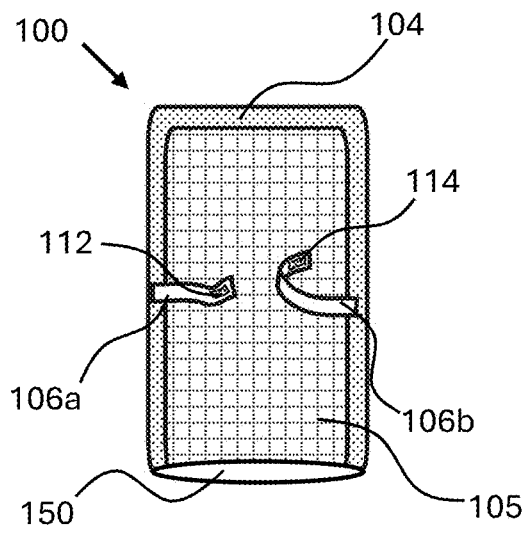
FIG. 16 is a rear view of a sleeve-like RPD device for a smart phone, wherein the RPD device has an elastic fabric covering most of the rear portion of the RPD device, according to some embodiments of the present invention.
Figure 17:
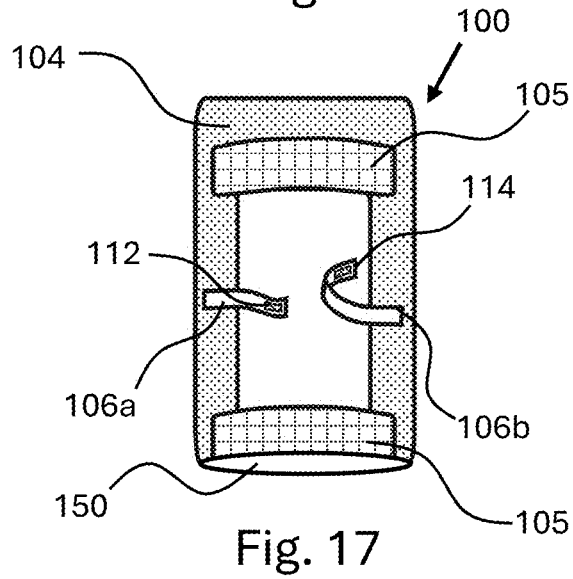
FIG. 17 is a rear view of a sleeve-like RPD device for a smart phone, wherein the RPD device has an elastic fabric covering a part of the rear portion of the RPD device, according to some embodiments of the present invention.
Figure 18:
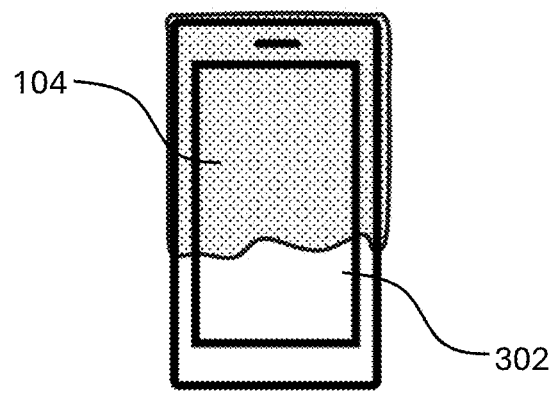
FIG. 18 illustrates the front of a smart phone partially covered by a sleeve-like RPD device of the present invention.
Figure 19:
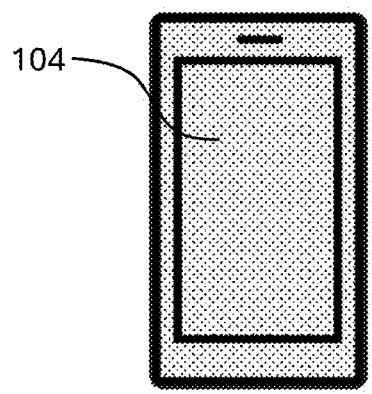
FIG. 19 illustrates the front of the smart phone completely covered by the sleeve-like RPD device of the present invention.

FIG. 10 is a front view of a sleeve-like RPD device for a computer monitor, according to some embodiments of the present invention. FIG. 11 is a rear view of a sleeve-like RPD device for a computer monitor 202, wherein the RPD device has an elastic an elastic fabric covering most of the rear portion of the RPD device, according to some embodiments of the present invention. FIG. 12 is a rear view of a sleeve-like RPD device for a computer monitor, wherein the RPD device has an elastic an elastic fabric covering a part of the rear portion of the RPD device, according to some embodiments of the present invention. FIG. 13 illustrates the front of a laptop monitor partially covered by a sleeve-like RPD device of the present invention. FIG. 14 illustrates the front of the laptop monitor completely covered by the sleeve-like RPD device of the present invention. FIG. 15 is a front view of a sleeve-like RPD device for a smart phone 302, according to some embodiments of the present invention. FIG. 16 is a rear view of a sleeve-like RPD device for a smart phone, wherein the RPD device has an elastic an elastic fabric covering most of the rear portion of the RPD device, according to some embodiments of the present invention. FIG. 17 is a rear view of a sleeve-like RPD device for a smart phone, wherein the RPD device has an elastic an elastic fabric covering a part of the rear portion of the RPD device, according to some embodiments of the present invention. FIG. 18 illustrates the front of a smart phone partially covered by a sleeve-like RPD device of the present invention. FIG. 19 illustrates the front of the smart phone completely covered by the sleeve-like RPD device of the present invention.

In some embodiments of the present invention, the RPD device 100 is in the form of a sleeve. The sleeve-like RPD device is adapted for computer monitors, tablets, and smart phones, which do not dissipate heat from the rear like televisions or monitors, and do not have sockets in the rear.

Computer monitors dissipate heat via the computer, while tablets and smartphones may have vents at the bottom end.

The RPD device 100 is configured to cover the display (computer monitor 202, smart phone 302, or tablet) from front, rear, and top, and has an opening 150 on the bottom for fitting over the display. The sleeve has a front portion and a rear portion. The front portion includes the cloth sheet 104. In the rear portion, the cloth sheet is cut out and the cutout is covered by the fastening element, which includes an elastic fabric 105 joined to edges of the cutout in cloth sheet 104. In use, the elastic fabric 105 contacts the rear of the display and is configured to keep the front portion taut and in contact with the front of the display via elastic force.

The RPD device 100 may be slipped onto the display from the top of the display, like a sock, as seen in FIGS. 13 and 18, until the RPD device 100 fully covers the display (FIGS. 14 and 18). The dimensions of the RPD device 100 are chosen so that insertion of the display into the RPD device 100 causes stretching of the RPD device 100. The stretching causes the RPD device 100 to securely grasp the display, preventing the RPD device from easily slipping away. The stretching also causes the cloth sheet 104 to be taut against the front of the display.

In some embodiments of the present invention, the elastic fabric 105 extends along most of the rear of the RPD device (FIGS. 11 and 16). In some embodiments of the present invention, the elastic fabric 105 only extends along the bottom section of the rear of the RPD device (FIGS. 12 and 17). In some embodiments of the present invention, the rear of the RPD device may have an opening, to enable heat transfer between the rear surface of the display and air (FIGS. 12 and 17).

In some embodiments of the present invention, the sock-like RPD device 100 includes strap segments 106a and 106b joined to the cloth sheet 104, on the outer surface of the cloth sheet that faces outward from the rear of the display. The straps segments 106a and 106b have, respectively, a hook portion 112 and a loop portion 114, for joining the strap segments together and stretching the cloth sheet 104 over the front of the display.

What is claimed is:

1. A rear projection display (RPD) device for use with a display,
   the rear projection display device comprising:
   a flexible cloth sheet having an inner surface and an outer surface, the flexible cloth sheet being configured to absorb light emitted by a display behind the inner surface and to display the light absorbed on the outer surface for viewing ahead of the display, while placed in front of the display and in contact with a front of the display;
   an elastic band loop joined to the cloth sheet along a perimeter of the cloth sheet, the elastic band loop having an equilibrium length shorter than the perimeter of the cloth sheet.

2. The RPD device of claim 1, wherein the cloth sheet has a portion that is folded upon itself to create a fold around the elastic band and sewn to itself to retain the elastic band inside the fold.

3. The RPD device of claim 1, wherein the cloth sheet is:
   stretchable in a first direction and not stretchable in a second direction perpendicular to the first direction; or
   stretchable in the first direction and in the second direction.

4. The RPD device of claim 1, wherein the cloth sheet comprises a first fabric, wherein the first fabric comprises at least one of: viscose, bamboo, nylon, tnt, cotton, polycotton, polyester, and polypropylene, rayon, or nylon wool.

5. The RPD device of claim 4, wherein the cloth sheet comprises 80%-100% of the first fabric and 0%-20% of elastane by weight.

6. The RPD device of claim 5, wherein the cloth sheet comprises 90%-99% of the first fabric and 1%-10% of elastane by weight.

7. The RPD device of claim 1, wherein cloth sheet comprises a first fabric which comprises synthetic fabric configured to become electrostatically induced by electrical charge on the front of the display when the display is on and when the cloth sheet is in a vicinity of the front of the display.

8. The RPD device of claim 7, wherein the cloth sheet comprises 80%-100% of the first fabric and 0%-20% of elastane by weight.

9. The RPD device of claim 8, wherein the cloth sheet comprises 90%-99% of the first fabric and 1%-10% of elastane by weight.

10. The RPD device of claim 1, wherein a lower section of the perimeter of the cloth sheet has an internally rounded or internally bending shape.

11. The RPD device of claim 1, wherein the cloth sheet is white.

12. A rear projection display device for use with a display, the rear projection display device comprising:
    a flexible cloth sheet having an inner surface and an outer surface, the flexible cloth sheet being configured to absorb light emitted by a display behind the inner surface and to display the light absorbed on the outer surface for viewing ahead of the display, while placed in front of the display and in contact with a front of the display;
    wherein the cloth sheet comprises a first fabric which comprises a synthetic fabric configured to become electrostatically induced by electrical charge on the front of the display when the display is on and when the cloth sheet is in a vicinity of the front of the display.

13. The RPD device of claim 12, wherein the cloth sheet comprises 80%-100% of the first fabric and 0%-20% of elastane by weight.

14. The RPD device of claim 13, wherein the cloth sheet comprises 90%-99% of the first fabric and 1%-10% of elastane by weight.

15. The RPD device of claim 12, wherein the cloth sheet is:
    stretchable in a first direction and not stretchable in a second direction perpendicular to the first direction; or
    stretchable in the first direction and in the second direction.

16. The RPD device of claim 12, further comprising an elastic band loop joined to the cloth sheet along a perimeter of the cloth sheet, the elastic band loop having an equilibrium length shorter than the perimeter of the cloth sheet.

17. The RPD device of claim 16, wherein the cloth sheet has a portion that is folded upon itself to create a fold around the elastic band and sewn to itself to retain the elastic band inside the fold.

18. The RPD device of claim 12, wherein a lower section of a perimeter of the cloth sheet has an internally rounded or internally bending shape.

19. The RPD device of claim 12, wherein the cloth sheet is white.

20. A rear projection display (RPD) device for use with a display, the rear projection display device comprising:

a flexible cloth sheet having an inner surface and an outer surface, the flexible cloth sheet being configured to absorb light emitted by a display behind the inner surface and to display the light absorbed on the outer surface for viewing ahead of the display, while placed in front of the display and in contact with a front of the display.

\* \* \* \* \*